US009785523B2

United States Patent
Chiruvolu et al.

(10) Patent No.: US 9,785,523 B2
(45) Date of Patent: Oct. 10, 2017

(54) MANAGING REPLICATED VIRTUAL STORAGE AT RECOVERY SITES

(75) Inventors: Phani Chiruvolu, Hyderabad (IN); Gaurav Sinha, Hyderabad (IN); Devdeep Singh, Hyderabad (IN); Jacob Oshins, Seattle, WA (US); Christopher L. Eck, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 815 days.

(21) Appl. No.: 13/163,760

(22) Filed: Jun. 20, 2011

(65) Prior Publication Data
US 2012/0324183 A1 Dec. 20, 2012

(51) Int. Cl.
  *G06F 12/00* (2006.01)
  *G06F 11/20* (2006.01)
  *G06F 11/14* (2006.01)

(52) U.S. Cl.
  CPC ...... *G06F 11/2038* (2013.01); *G06F 11/2097* (2013.01); *G06F 11/1484* (2013.01); *G06F 2201/815* (2013.01); *G06F 2201/84* (2013.01)

(58) Field of Classification Search
  CPC ........ G06F 3/0647; G06F 3/065; G06F 9/455; G06F 2009/455; G06F 9/45558; G06F 11/14; G06F 11/202; G06F 11/203
  USPC ......................................................... 711/162
  See application file for complete search history.

(56) References Cited

U.S. PATENT DOCUMENTS

| 6,795,966 B1* | 9/2004 | Lim et al. .......................... 718/1 |
| 7,143,307 B1 | 11/2006 | Witte et al. |
| 7,533,229 B1* | 5/2009 | van Rietschote ............. 711/161 |
| 2006/0085792 A1 | 4/2006 | Traut |

(Continued)

FOREIGN PATENT DOCUMENTS

| CN | 101421715 A | 4/2009 |
| JP | 2009146169 A | 7/2009 |

(Continued)

OTHER PUBLICATIONS

VMware, Inc. "Virtual Disk API Programming Guide, Virtual Disk Development Kit (VDDK) 1.2" [released Nov. 18, 2010] (labeled A011 NPL VMware VDDK).*

(Continued)

*Primary Examiner* — Charles Rones
*Assistant Examiner* — Nanci Wong
(74) *Attorney, Agent, or Firm* — Fiala & Weaver P.L.L.C.

(57) ABSTRACT

Techniques involving replication of storage are described. A representative technique includes apparatuses and methods for receiving replicated virtual storage of a replicated virtual machine, including at least a replicated base virtual disk that substantially corresponds to a primary base virtual disk to be replicated. Copies of differencing disks or other forms of virtual storage updates are received at a recovery site, each of the differencing disks being associated with the primary base virtual disk as descendents thereof. The received copies of the differencing disks are arranged relative to the replicated base virtual disk corresponding to the manner in which the differencing disks were arranged relative to the primary (Continued)

US 9,785,523 B2

Page 2 base virtual disk, thereby maintaining the data view of the replicated virtual machine in synchronization with the virtual machine at the primary site.

20 Claims, 11 Drawing Sheets

(56) References Cited

U.S. PATENT DOCUMENTS

| 2006/0225065 | A1 | 10/2006 | Chandhok et al. |
| 2007/0208918 | A1 | 9/2007 | Harbin |
| 2007/0244938 | A1* | 10/2007 | Michael et al. ............ 707/204 |
| 2007/0276885 | A1* | 11/2007 | Valiyaparambil et al. ... 707/204 |
| 2009/0113109 | A1 | 4/2009 | Nelson et al. |
| 2009/0144515 | A1 | 6/2009 | Benari |
| 2010/0077165 | A1 | 3/2010 | Lu et al. |
| 2010/0107158 | A1* | 4/2010 | Chen et al. .................... 718/1 |
| 2012/0191908 | A1* | 7/2012 | North ................. G06F 11/2097 711/112 |

FOREIGN PATENT DOCUMENTS

| JP | 2009533777 A | 9/2009 |
| RU | 2433458 C2 | 11/2011 |

OTHER PUBLICATIONS

Petrovic, Darko, "Virtual Machine Replication", Retrieved at <<http://wiki.epfl.ch/edicpublic/documents/Candidacy%20exam/petrovic%20darko%20-%20candidacy%20exam%20report.pdf>>, 2009, pp. 8.

Neurohr, Jason, "Recovering Your Virtual Machine. How to Manually Merge Hyper-V Snapshots Back into one VHD", Retrieved at <<http://networkfoo.org/server-infrastructure/recovering-your-virtual-machine-how-manually-merge-hyper-v-snapshots-back-one->>, Oct. 15, 2009, pp. 10.

"Using Differencing Disks", Retrieved at <<http://technet.microsoft.com/en-us/library/cc720381(WS.10).aspx>>, Retrieved Date: Mar. 23, 2011, pp. 3.

PCT International Search Report and Written Opinion for Application No. PCT/US2012/042107, Reference 332617-02, Jan. 23, 2013.

Office Action received for New Zealand Patent Application No. 619304, Mail date: Jul. 17, 2014, 2 Pages.

Search Report Issued in European Patent Application No. 12802797.6, Mail Date: Feb. 20, 2015, 7 Pages.

First Office Action and Search Report Issued in Chinese Patent Application No. 201280030475.4, Mail Date: Aug. 4, 2015, 14 Pages.

Office Action Issued in Colombia Patent Application No. 14-009479, Mailed Date: Jul. 16, 2015, 8 Pages. (W/O English Translation).

International Preliminary Report on Patentability Issued in PCT Application No. PCT/US2012/042107, Mailed Date: Dec. 23, 2013, 8 Pages.

"Office Action Issued in New Zealand Patent Application No. 714756", Mailed Date: Dec. 22, 2015, 2 Pages.

Office Action Issued in Chile Patent Application No. 3615-2013, Mail Date: May 4, 2015, 5 Pages. (w/o English Translation).

Office Action Issued in Japanese Patent Application No. 2014-517016, Mailed Date: Apr. 26, 2016, 5 Pages.

"Second Office Action Issued in Chinese Patent Application No. 201280030475.4", Mailed Date: Mar. 17, 2016, 10 Pages.

"Office Action Issued for Russian Patent Application No. 2013156675", Mailed Date: Jun. 2, 2016, 5 Pages. (w/o English Translation).

"Office Action Issued in Australian Patent Application No. 2012273366", dated Aug. 8, 2016, 3 Pages.

"Office Action Issued in Australian Patent Application No. 2012273366", dated Sep. 28, 2016, 4 Pages.

"Office Action Issued in Philippines Patent Application No. 1-2013-502660" dated Sep. 8, 2016, 5 Pages.

"Office Action Issued in Mexican Patent Application No. Mx/a/2013/015361", dated Jun. 9, 2016, 6 Pages.

"Office Action Issued in Philippines Patent Application No. Jan. 2013-502660", dated Nov. 4, 2016, 2 Pages.

"Notice of Allowance Issued in Russian Patent Application No. 2013156675", dated Jan. 11, 2017, 11 Pages.

"Office Action Issued in Philippines Patent Application No. PH/1/2013/502660", dated May 12, 2017, 2 Pages.

* cited by examiner

MANAGING REPLICATED VIRTUAL STORAGE AT RECOVERY SITES

BACKGROUND

With the heavy reliance on computing needs by businesses and individuals, the need for uninterrupted computing service has become increasingly vital. Many organizations develop business continuity plans to ensure that critical business functions will enjoy continuous operation and remain available in the face of machine malfunctions, power outages, natural disasters, and other disruptions that can sever normal business continuity.

Local disruptions may be caused, for example, by hardware or other failures in local servers, software or firmware issues that result in system stoppage and/or re-boot, etc. Local solutions may include server clustering and virtualization techniques to facilitate failover. Local failover techniques using virtualization provide the ability to continue operating on a different machine or virtual machine if the original machine or virtual machine fails. Software can recognize that an operating system and/or application is no longer working, and another instance of the operating system and application(s) can be initiated in another machine or virtual machine to pick up where the previous one left off. For example, a hypervisor may be configured to determine that an operating system is no longer running, or application management software may determine that an application is no longer working which may in turn notify a hypervisor or operating system that an application is no longer running. High availability solutions may configure failover to occur, for example, from one machine to another at a common site, or as described below from one site to another. Other failover configurations are also possible for other purposes such as testing, where failover may even be enabled from one virtual machine to another virtual machine within the same machine.

Disaster recovery relates to maintaining business continuity on a larger scale. Certain failure scenarios impact more than an operating system, virtual machine, or physical machine. Malfunctions at a higher level can cause power failures or other problems that affect an entire site, such as a business's information technology (IT) or other computing center. Natural and other disasters can impact an enterprise that may cause some, and often all, of a site's computing systems to go down. To provide disaster recovery, enterprises today may back up a running system onto tape or other physical media, and mail or otherwise deliver it to another site. When a data center goes offline for any reason, the backup data center can take over operations with the backup media. Among other shortcomings, the process of providing physical media is cumbersome, the backups have significant time intervals between one another, and recovery systems can be days out of date.

SUMMARY

Techniques involving replication of storage, including virtual storage associated with virtual machines, are described. One representative technique includes an apparatus capable of receiving replicated virtual storage of a replicated virtual machine, including at least a replicated base virtual disk that substantially corresponds to a primary base virtual disk to be replicated. A receiver receives copies of differencing disks or other forms of virtual storage updates, each of which are associated with the primary base virtual disk as descendents thereof. A replication management module is configured to arrange the received copies of the differencing disks relative to the replicated base virtual disk in a manner corresponding to how the differencing disks were arranged relative to the primary base virtual disk.

A particular implementation of such a technique involves the copies of the differencing disks being of a plurality of replication or "copy" types, where the replication management module is configured to arrange the plurality of replication types relative to the replicated base virtual disk as they were arranged relative to the primary base virtual disk. Examples of the plurality of types include copies of the differencing disks that were obtained after one or more applications operating on the virtual machine prepared themselves for the copy, and copies of the differencing disks that were obtained without notice or preparation for the copy.

In another representative embodiment, a computer-implemented method for facilitating virtual storage replication is provided. A base virtual disk image of a virtual disk that is associated with a virtual machine is stored. Changes to the virtual disk are stored by recording the changes to a current read-write differencing disk at the top of a disk chain that includes the base virtual disk image and any intervening differencing disks. On a regular or irregular basis, transferable copies of the virtual disk changes are created for replicated storage by replicating the current read-write differencing disk and prohibiting further changes thereto, creating a new current differencing disk at the top of the disk chain, and transferring the copies of the differencing disks for the replicated storage.

In another representative embodiment, one or more computer-readable media are provided that have instructions stored thereon that are executable by a computing system for performing various functions. The functions include creating a chain of read-only snapshots of a virtual machine's differencing disk, with a new differencing disk being created upon each snapshot that provides read and write capability at the tip of the chain. A plurality of snapshot types are included on the chain, including at least an application-consistent snapshot type and a crash-consistent snapshot type. A replicated chain of the read-only snapshots is created, which corresponds to the chain of read-only snapshots of the virtual machine's differencing disk. Selection of one of the read-only snapshots in the replicated chain as a restoration point for initiating a replicated virtual machine is facilitated. The replicated virtual machine is initiated from the selected one of the read-only snapshots and including one or more of the read-only snapshots that follow the selected restoration point in succession.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
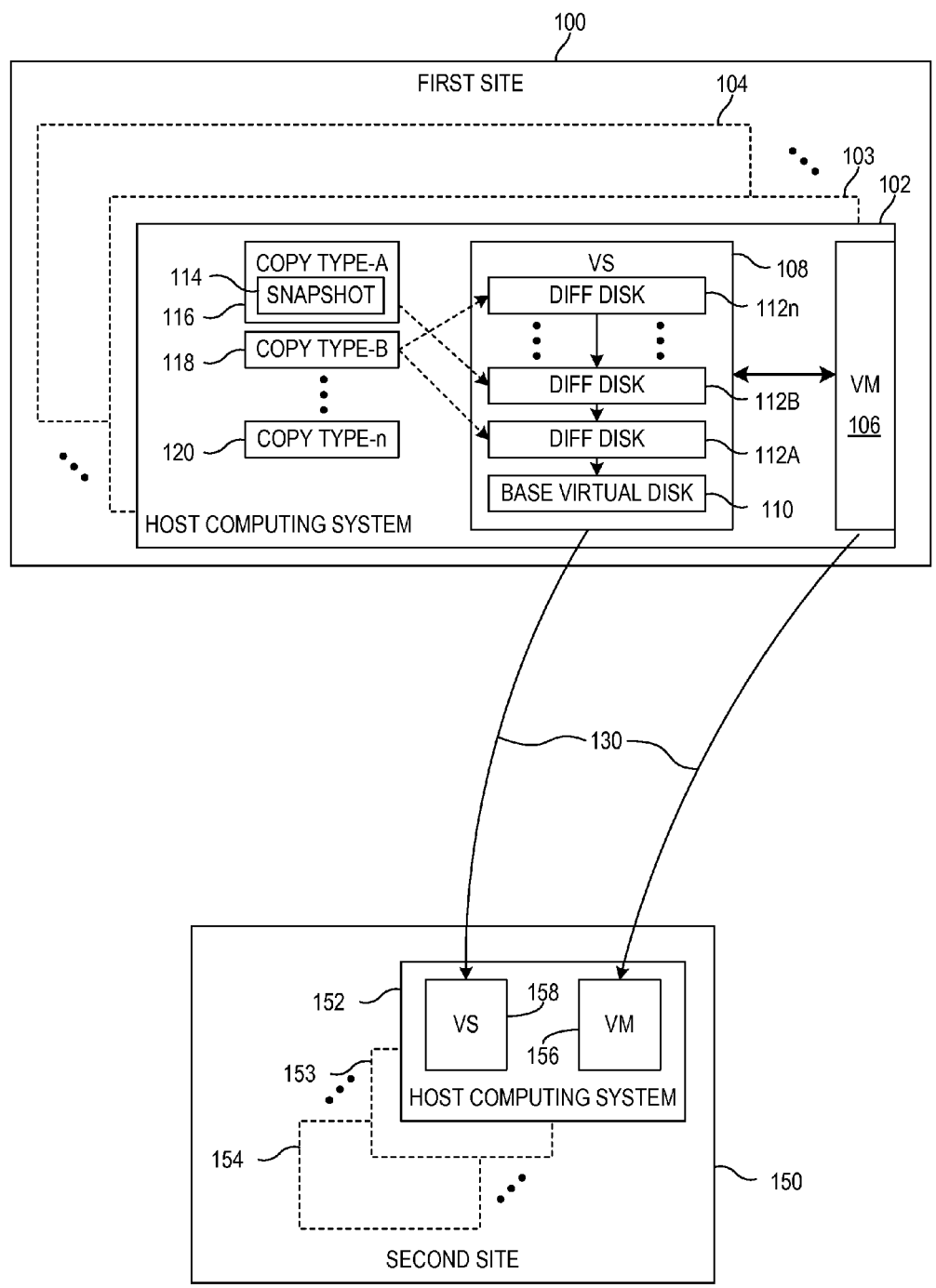
FIG. 1 generally illustrates a representative embodiment for replicating virtual machines using differencing disks.

In the following description, reference is made to the accompanying drawings that depict representative implementation examples. It is to be understood that other embodiments and implementations may be utilized, as structural and/or operational changes may be made without departing from the scope of the disclosure.

The disclosure is generally directed to data replication and recovery. While the principles described herein are applicable to any replication of data from one data storage device or facility to another data device or facility, numerous embodiments in this disclosure are described in the context of disaster recovery where replicated data and processing resources are provided off-site from the primary computing center. It should be recognized, however, that the principles described herein are applicable regardless of the distance or manner in which replicated data is transferred to the recovery site(s). Certain embodiments are also described in the context of virtual machines, although the principles are equally applicable to physical machines and their available storage.

As noted above, system backup information is often made on physical media and physically provided to a remote recovery site. When a data center goes offline, the backup data center can take over operations with the backup media. Repeatedly providing physical media to the recovery site is burdensome. Recovery would involve using backup data already available at the recovery site, which could be from a day or more before, or recovery would have to wait until more recent replication data arrived at the recovery site. These solutions do not provide a high degree of business continuity.

A full backup of data at a primary site could be obtained and delivered electronically to a recovery site. However, the size of the data transmissions could be very large, making regular organization and ultimate transmission of such information unmanageable. Providing replicated data on an infrequent basis to alleviate these transmission issues can result in less desirable recovery when needed, as changed data may be lost in the long interims of time between backups. Building disaster recovery strategies using backups in such manners leads to complex processes with very high recovery point objective (RPO) and recovery time objective (RTO).

The disaster recovery process can be simplified by having a replicated copy of a machine's storage, or of a virtual machine, at a site different from the site where the primary server(s) is running. As used herein, unless otherwise noted, a "copy" generally refers to a replication of the virtual machine or virtual machine storage at issue. Thus, "replication" and "copy" may be used interchangeably herein. Updates from the primary server to the replicated copy of the virtual machine or storage may be made. Replicating a virtual machine differs from backing up an application or operating system stack, as replication of a virtual machine involves replicating both the storage and virtual machine configuration, and the workload arrives at the recovery site in a condition where it does not require reconfiguration. For example, the virtual machine container will already have the correct number of network interfaces and other such configurations, and they are configured in the manner that the workload is expecting.

The disclosure provides mechanisms and methods that enable the replication of data associated with a virtual or physical machine. For example, in the context of virtual machines, the disclosure provides manners enabling the replication of one or more virtual machines' data which may be kept in the form of virtual disks or other similar files. Among other things, the disclosure also addresses mechanisms and methods that enable recovery site users to utilize a replicated copy of the virtual machine in the event that a disaster or other occurrence impacts the primary site's ability to carry on normally.

Various embodiments below are described in terms of virtual machines. Virtualization generally refers to an abstraction from physical resources, which can be utilized in client and server scenarios. Hardware emulation involves the use of software that represents hardware the operating system would typically interact with. Hardware emulation software can support guest operating systems, and virtualization software such as a hypervisor can establish a virtual machine (VM) on which a guest operating system operates. Much of the description herein is described in the context of virtual machines, but the principles are equally applicable to physical machines that do not employ virtualization.

FIG. 1 generally illustrates a representative embodiment for replicating virtual machines using differencing disks. A first site 100 may include one or more host computing systems 102-104 which may host one or more virtual machines (VM) 106. The computing system 102 has associated storage, and in the example of FIG. 1 the virtual machine 106 has associated virtual storage (VS) 108. The virtual storage may represent, for example, a virtual hard drive which in general represents logical storage typically provided as a disk image file(s). The virtual machine 106 sees the virtual storage 108 as its hard drive or other similar storage device.

In one embodiment, replication of stored data or other information in the virtual storage 108 includes the use of a storage state chain or tree, where the top of the chain (also referred to herein as the tip of tree) provides both read and write capability to record changes written to the virtual storage. For example, the virtual storage 108 may represent a virtual hard disk having a virtual hard disk (VHD) file format. The storage tree may include a base virtual disk 110, and one or more differencing disks 112A-112n that are associated with the base virtual disk 110. The differencing disk 112A that is the child of the base virtual disk 110 captures changes to the virtual storage 108. As described more fully below, a differencing disk such as differencing disk 112A may be preserved through write protection, and a new differencing disk such as differencing disk 112B can be created to accept changes to the virtual storage 108 from that point forward. This can continue through any number of differencing disks 112n, thereby creating a chain of preserved virtual disks and a differencing disk 112n to capture new changes.

At least one second site 150 is provided that includes one or more host computing systems 152, 153, 154 where replicated information from the first site 100 may be received and stored, and where recovery computing operations can be initiated in the event of disaster or other event rendering the first site 100 unable to continue its computing responsibilities. The first site 100 and second site 150 communicate by way of communication links 130, which can involve any type of electronic communication interface such as direct cabling, wireline networks, wireless networks and the like, and any combination thereof. A replication of the virtual machine 106 may be provided to the second site 150 by way of electronic means or otherwise to provide the replicated virtual machine 156. Similarly, the differencing disks 112A-112n or other portions of the virtual storage 108 designed to capture changes to the virtual storage 108 may be transferred when the data has been protected from further write operations, as described more fully below. The replicated virtual storage 158 therefore corresponds to that which has been transferred from the virtual storage 108 at the primary site 100.

Storage, such as virtual storage 108 at the first site 100, could stream its data to the second site asynchronously. However, in such an arrangement, if the first site 100 was to fail, it would be difficult for the second site 150 to know what has been successfully transferred and whether the storage is coherent. The present disclosure describes that snapshots (or other fixed images) of the first site's 100 differencing disks 112A-112n are created, and transferred to the second site 150. Using a snapshotting feature enables asynchronous replication of the storage 108 of a virtual machine 106 from one place to another. In this manner, if a primary server(s) at the first site 100 fails or otherwise goes offline, there will be no differences between the snapshots and the data that was replicated. Consequently, it will be known what data has been received at the second site 150. The disclosure thus contemplates the first site 100 transferring snapshots or other images of differencing disks at particular times to the second site 150.

For example, when a replication of the virtual storage 108 is obtained, it may further involve transferring the differencing disk data to the second site 150, and creating a new differencing disk. As a more particular example, a snapshot 114 or other replication/copy may be taken of differencing disk 112B to provide an image (e.g., AVHD image file) to the host computing system 152 at the second site 150. In one embodiment, the differencing disk 112B of which the snapshot 114 was taken will be changed to read-only, and a new differencing disk 112n will be created as a read/write virtual storage file.

Some embodiments involve different types of copies of the differencing disks or other virtual storage images. FIG. 1 depicts a plurality of such different replication or "copy" types, including copy type-A 116, copy type-B 118 through copy type-n 120. For example, a first copy type, such as copy type-B 118, may represent a low-impact copy/snapshot of a differencing disk 112A-112n that has occurred without significant efforts to increase the coherency of the data. One manner of obtaining such a copy is to mark the particular differencing disk read-only at any desired time, and create a new differencing disk to capture written data thereafter. For example, a virtual machine snapshot may be obtained using, for example, virtualization software, a hypervisor, operating system functionality, etc., which can capture the state, data and hardware configuration of a running virtual machine. This type of copy or other similar low-impact copy may be referred to in this disclosure as a crash-consistent copy, as what is stored on the differencing disk generally corresponds to that which would be on the disk following a system failure or power outage. In these cases, applications may be running that temporarily store data in cache or memory that has not been stored to memory. File system metadata may not have all managed to make it onto the disk before it was marked read-only. With this type of copy, it is possible that an attempt to reanimate the copy at a recovery site will not be entirely successful as the data may not be completely coherent. Nevertheless, this type of copy does not cause the running programs to be interrupted, and therefore has very low cost as it pertains to system performance of the computing systems 102-104 at the first site 100.

Another type of copy, such as copy type-A 116, may represent a higher coherency copy/snapshot of a differencing disk 112A-112n that occurred with some effort to increase the coherency of the data prior to the snapshot 114 being taken. For example, such a snapshot 114 may be obtained using an operating system service such as the volume shadow copy service (VSS) by MICROSOFT® Corporation that coordinates between the backup functionality and the user applications that update data on the disk. The running software (i.e., the data writers) can be notified of an impending backup, and bring their files to a consistent state. This type of copy provides a higher likelihood of proper reanimation at the second site 150. However, because the running applications may need to prepare for the backup by flushing input/output (I/O), saving its state, etc., the running workload is interrupted and subject to latencies and lower throughput. Different copy types can be used at different times or on different schedules to provide a desired balance between workload interruption and data coherency.

As described above, the disclosure sets forth manners in which stored data associated with a physical machine(s) or virtual machine(s) is replicated from a first site 100 to at least one second site 150. Embodiments involve providing snapshots or other copies of disk image portions such as differencing disks, while enabling multiple types of copies to be obtained to regularly provide replicated data at a second or "recovery" site while keeping processing interruptions at the first or "primary" site at a manageable level. Snapshots transferred to the second site 150 can be chained analogously to that at the primary site 100. Further, the servers at both the first and second sites 100, 150 can facilitate the merging of write protected differencing disks into their respective parent disks, to reduce storage capacity requirements, reduce access latencies, etc. As described more fully below, the differencing disks transferred by the first site 100 are received at the second site 150 and chained at the top of the existing disk chain of the replicated copy of the virtual machine, thereby keeping the data view of the replicated virtual machine synchronized with that of the primary server(s).

Figure 2A:
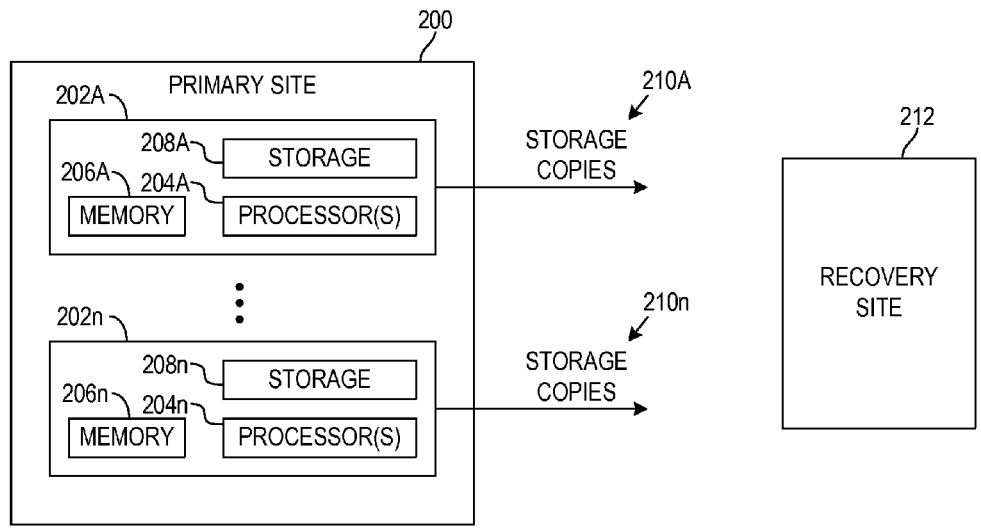
FIGS. 2A and 2B depict representative computing environments in which replication in accordance with the disclosure may be implemented.
Figure 2B:
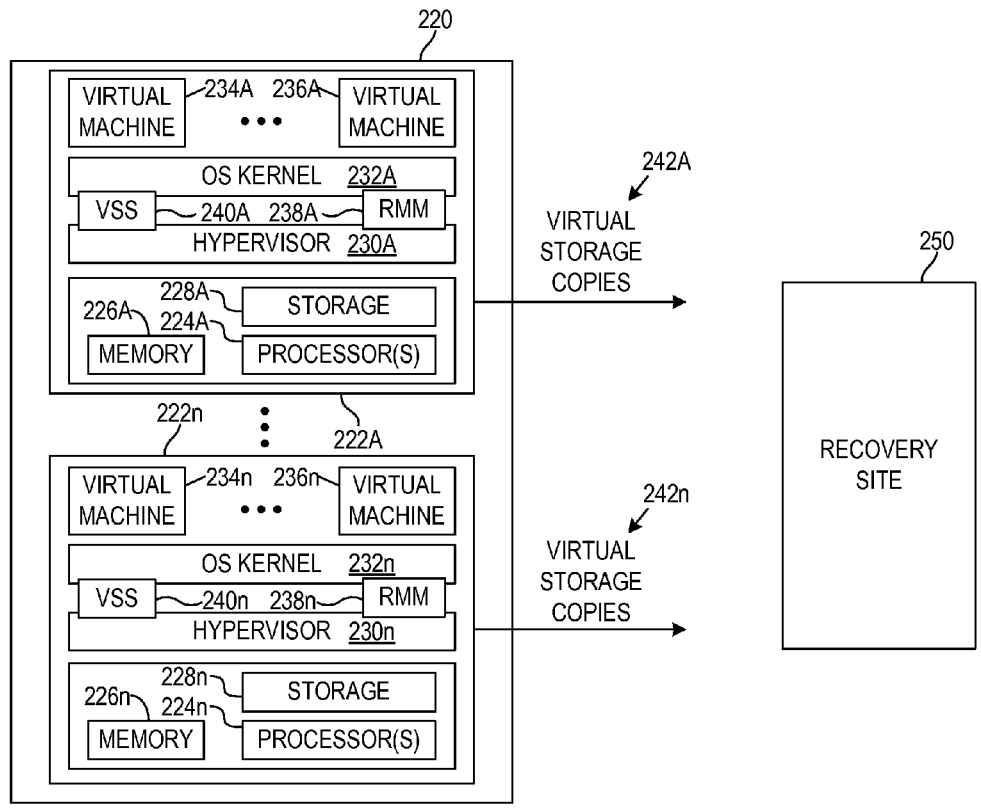

FIGS. 2A and 2B depict representative computing environments in which replication in accordance with the disclosure may be implemented. The representative systems of FIGS. 2A and 2B are merely examples, and clearly do not represent exclusive arrangements. The computing environment in FIG. 2A illustrates a first site, such as a primary server site 200. In this example, the primary server site 200 includes one or more servers 202A-202n or other computing devices. Each of the servers 200A-200n may respectively include computing capabilities such as one or more physical or logical processors 204A, 204n, memory 206A, 206n, storage 208A, 208n, etc. Storage 208A, 208n may be replicated, such that storage copies 210A, 210n such as storage snapshots may be provided to a recovery site(s) 212 for disaster recovery purposes. FIG. 2A illustrates that the techniques described herein are applicable to any storage associated with a processor, as well as applicable to virtual storage and virtual machines. It should be noted that the recovery site 212 may include servers or other computing devices having similar processing, memory and storage capabilities.

FIG. 2B illustrates an example involving one or more virtual machines. In this example, primary 220 and recovery 250 server sites respectively include one or more servers 222A-222n, which each may include computing capabilities such as one or more physical or logical processors 224A, 224n, memory 226A, 226n, storage 228A, 228n, etc. One or more of the servers may include a hypervisor 230A, 230n or other virtual machine management module that presents a virtual operating platform on which operating systems 232A, 232n and virtual machines 234A-236A, 234n-236n may operate. Features of the hypervisor 230A, 230n and/or operating system 232A, 232n may be used, adapted or added to provide functionality such as the replication management module (RMM) 238A, 238n. In accordance with the present disclosure, the replication management module 238A, 238n can provide functionality such as storing which changes (e.g., differencing disk) were the last changes to be transferred from the primary site 220 to the recovery site 250, requesting that copies be made in response to schedules or other event triggers, readying information for transfer to the recovery site 250, merging differencing disks into their respective parent disks, etc. Virtual storage (not shown) is associated with each virtual machine, which may be stored in files in the servers' 222A, 222n memory 226A, 226n, local storage 228A, 228n, clustered storage (not shown) if the servers 222A, 222n are configured in a cluster, etc. The virtual storage may be replicated, such that storage snapshots or other copies 242A, 242n are provided to a recovery site(s) 250 for disaster recovery or other purposes. FIG. 2B therefore illustrates that techniques described herein are applicable to virtual storage associated with a virtual machine. It should be noted that the recovery site 250 may include servers or other computing devices having analogous processing, memory, storage, virtual machine and virtual machine management capabilities as described in FIGS. 2A and/or 2B.

Figure 3:
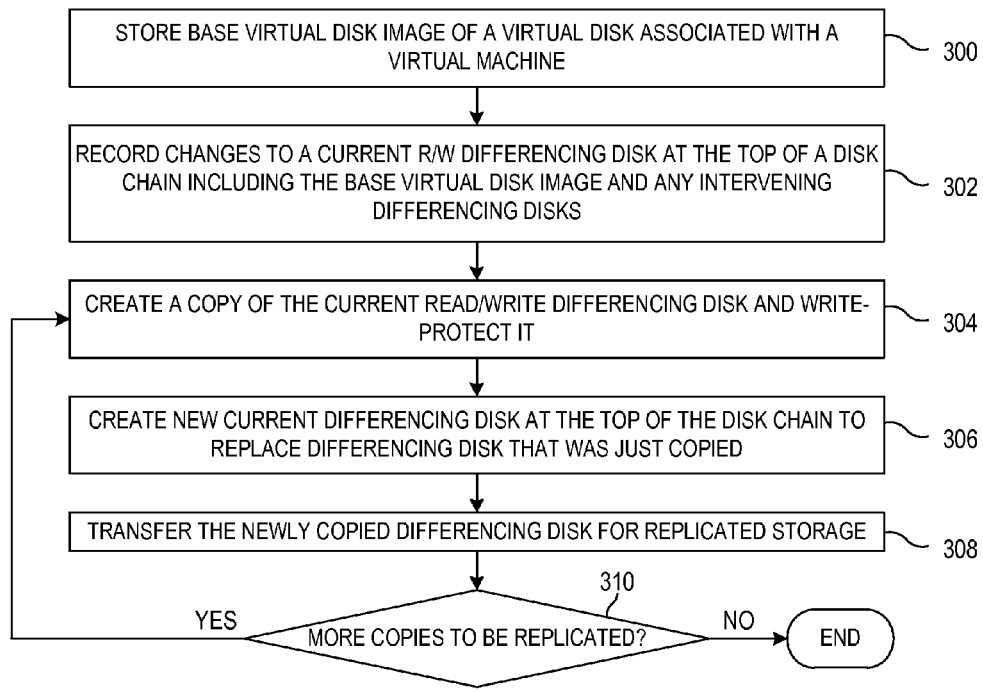
FIG. 3 illustrates a representative manner in which a primary computer/server environment can facilitate its disaster recovery and have its data replicated as it changes over time.
Figures 4A, 4B:
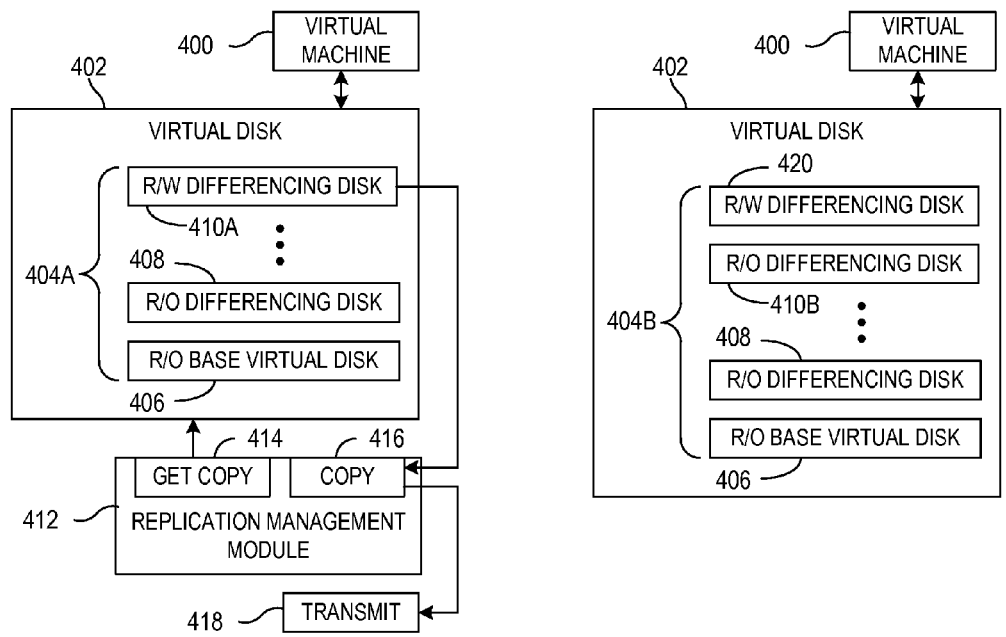
FIGS. 4A and 4B depict successive states of a representative disk chain as virtual storage is modified and one or more copies are made.

FIG. 3 illustrates a representative manner in which a primary computer/server environment can facilitate its disaster recovery and have its data replicated as it changes over time. FIG. 4A depicts a first state of a disk chain 404A, and FIG. 4B depicts a second state of the disk chain 404B. In the following example, FIGS. 3, 4A and 4B are referred to collectively.

A base virtual disk image 406 or other initial storage basis of a virtual machine's 400 virtual disk 402 is stored as depicted at block 300. As described further below, this base virtual disk image 406 may serve as the basis for the replication of virtual storage at a recovery site. The base virtual disk image 406 may be presented as a file, such as, for example, a virtual hard disk (VHD) file.

As shown at block 302, changes to the virtual disk 402 may be recorded to a current differencing disk 410A (FIG. 4A) that is capable of being written in addition to being read. In one embodiment, the current differencing disk 410A is logically at the top of a disk chain 404A that includes the base virtual disk image 406 and any intermediate differencing disks 408. If the current differencing disk 410A is the first child differencing disk of the parent base virtual disk 406, then there will be no intermediate differencing disks. Further, if intermediate differencing disks 408 have already been merged with the base virtual disk image 406, then there will be no intermediate differencing disks.

On the other hand, there may be differencing disks 408 that have been committed to read-only, such as when a snapshot or other copy of that differencing disk is to be preserved. So that the snapshot data (that may be transferred for replication) corresponds to the differencing disk, the differencing disk may be write protected in connection with the snapshot. In these cases, there may be one or more read-only differencing disks 408 between the base virtual disk image 406 and the current read/write differencing disk 410A. As described in greater detail below, the chain of at least the read-only disks at the primary site will be replicated at a recovery site(s), thereby keeping the data view of the replicated virtual machine synchronized with the corresponding server(s) at the primary site.

At some point, a copy of the current read/write differencing disk 410A will be created, and write-protected, as shown at block 304. For example, a request 414 for a copy of the current differencing disk 410A may be made by a processor-executable replication management module 412 that can be a service or feature of a hypervisor, host operating system, parent partition operating system, etc. As noted above, the type of copy to be made may also be noted, such as a crash-consistent copy where the application data may not have been prepared for the copy. Another example is an application-consistent copy having a higher likelihood of proper subsequent reanimation that may involve, for example, some notification to an application(s) to flush data/records and otherwise prepare for the snapshot or other copy.

The differencing disk that was at the top of the chain has been marked read-only, as depicted by the R/O differencing disk 410B in FIG. 4B. With this disk 410B having been write-protected, block 306 shows that a new differencing disk 420 may be created as the new top of the disk chain 404B to replace the differencing disk 410B that was just copied. This new "tip of tree" differencing disk 420 will assume the responsibilities of handling both read and write operations. In one embodiment, any non-merged intermediate differencing disks 408, 410B and the base virtual disk 406 below it will remain read-only.

In one embodiment, the read-only base virtual disk 406 and any read-only intermediate differencing disks 408, 410B have been transferred to the recovery site where the disk chain will be recreated for recovery purposes. This is noted at block 308, where the differencing disk 410B that was just copied and write protected may be transferred for replicated storage, such as transferred to an address of the replicated virtual machine. Thus, when the copy 416 is obtained, it may be transferred to a recovery site by a transmitter, transceiver, network interface, and/or other mechanism depicted by the transmit device 418. As long as the primary site is operational and more copies are to be replicated as determined at decision block 310, the process of creating copies and write protecting 304, creating new differencing disks 306, and transferring the snapshots 308 can continue. For example, a replication policy or replication rules may be established to determine when a copy should be made, and in the case of multiple copy types, which type of copy should be made.

Figure 5:
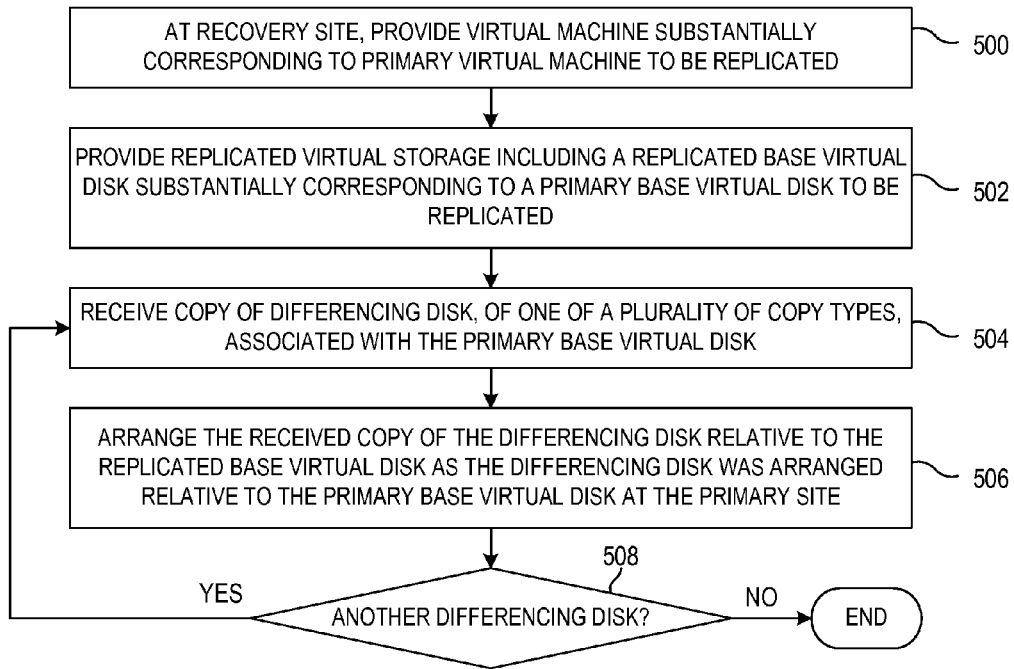
FIG. 5 is a flow diagram illustrating a representative manner in which the data view of a replicated virtual machine is kept in synchronization with its counterpart in the primary server.
Figure 6:
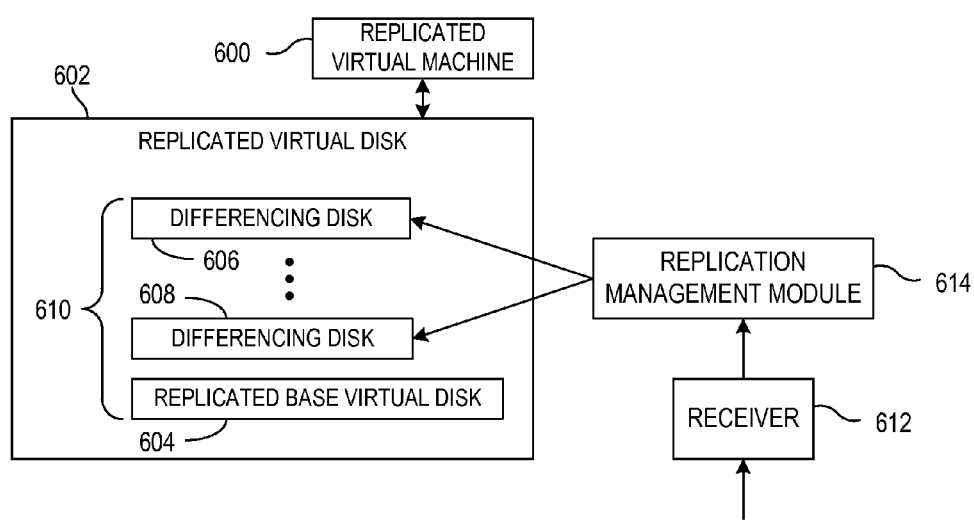
FIG. 6 depicts a replicated virtual disk and a replicated disk chain that corresponds to the preserved portion of the virtual storage at the primary site that is being replicated.

FIG. 5 is a flow diagram that illustrates a representative manner in which the data view of a replicated virtual machine is kept in sync with its counterpart in the primary server. FIG. 6 depicts a replicated virtual disk 600 and a replicated disk chain 610 that corresponds to the preserved portion of the virtual storage at the primary site that is being replicated. In the following example, FIGS. 5 and 6 are referred to collectively.

As shown at block 500, a replicated virtual machine 600 is provided at a recovery site, where the replicated virtual machine 600 substantially corresponds to the primary virtual machine that is to be replicated. This may be communicated electronically, or delivered by other means. A replicated virtual disk 602 or other replicated virtual storage is provided as shown at block 502. The replicated virtual disk 602 may include a replicated base virtual disk 604 substantially corresponding to a primary base virtual disk to be replicated (e.g., base virtual disk 400 of FIG. 4).

A copy of a differencing disk 606 that is associated with the primary base virtual disk, such as being a child or more distant descendant of the primary base virtual disk, is received as shown at block 504. In one embodiment, the received copy is one of a plurality of possible types of copies or replications. As shown at block 506, the received copy of the differencing disk 606 is arranged relative to the replicated base virtual disk 604 in the manner that it was arranged relative to the primary base virtual disk at the primary site. For example, if one or more intermediate differencing disks exist at the primary site, then copies/snapshots of those differencing disks 608 will be received and arranged in the replicated disk chain 610 as the preserved differencing disks are arranged in the primary disk chain (e.g., disk chain 404A/B of FIGS. 4A, 4B). While one or more of the intermediate differencing disks 608 may be merged into its base virtual disk 604 at the primary and/or recovery servers, the contents should remain in sync with the disk chain at the primary site.

If other differencing disks are received at the recovery site as determined at decision block 508, more differencing disks can be received 504 and arranged 506 to stay in sync with the primary site. These replicated differencing disks, e.g., snapshots or other copies, can be received by a receiver 612, which can represent a discrete receiver, transceiver, network interface, or any receiving mechanism. A replication management module 614 may be provided as a processor-executable module on a recovery server(s), such as on a server's hypervisor, host operating system, parent partition operating system, etc. The replication management module 614 may perform tasks such as holding the information regarding which was the last set of changes (e.g., differencing disk) to be received from the primary site, holding the type of copy it is (e.g., crash-consistent, application-consistent, etc.), determining which of a plurality of replicated differencing disk in which to begin processing if recovery operations are initiated, arranging the snapshots or other copies in a chain corresponding to that of the primary site, and other functions described herein.

As seen in the foregoing examples, the solutions provided in the present disclosure can use snapshot or other replication features to create differencing disks at periodic or other intervals. For example, hypervisors, other virtualization software, and/or operating systems may include a snapshot feature that may be used to create differencing disks. In one embodiment, differencing disks at the top of the disk chain accumulate changes while the read-only virtual hard disks further down the chain are transferred to the remote site, such as over a network. On the remote site, the received differencing disks may be chained at the top of the existing disk chain of the replicated copy of the virtual machine by creating and modifying snapshots, thereby keeping the data view of the replicated virtual machine in sync with the primary server.

Using such features, replication of running virtual machines can be provided that ensures correctness of replicated data by design. For example, the usage of differencing disks to accumulate writes on the primary server, and the chaining of the same disks to the replicated virtual machine on the remote site, ensures that no write will be lost by the replication process even in case of power failures or system crashes at either end. This mechanism provides consistency of the replicated data without requiring a resynchronization mechanism or consistency check mechanism.

The solutions described herein enable the creation of a copy of a running virtual machine and periodic synchronization of its data from a primary site to a recovery site in a non-disruptive manner. For example, a mechanism is provided to create a copy of a virtual machine running on primary site to a remote server by transferring the virtual machine's configuration and data disks over the network. Such a mechanism can allow the creation of differencing disks at the top of virtual machine's virtual hard disk chain, the transfer of the underlying read-only differencing disks over the network to the remote server, and the chaining of these disks to the virtual machine on the remote server. The creation of differencing disks allows the data transfer to occur without disruption to the running virtual machine.

Application-consistent points in time may be generated for the replicated copy of the virtual machine. For example, (VSS) snapshots may be used, which allows the applications inside the virtual machine to flush and quiesce their writes, so that the data up to that point provides a higher guarantees of recoverability. One exemplary methodology uses VSS snapshots to enable recovering from such higher guaranteed restoration points on the recovery server by reverting to the VSS snapshots.

The solutions described herein provide the ability to bring up a replicated virtual machine with data from one of a plurality of points in time, and to subsequently change the point in time if desired. For example, the mechanism creates and modifies snapshots to chain the differencing disks received from the primary server. The snapshots represent points in time of the replicated virtual machine's data. The method provides a mechanism to bring up the replicated virtual machine by creating a differencing disk to this point in time, and using it for bringing up the virtual machine. These differencing disks at the recovery site capture any writes generated by the replicated virtual machine. If the user chooses to change the point in time subsequently, the differencing disk may be discarded in favor of a new differencing disk that is created relative to the new point in time.

These methodologies further enable replication to be continued while running a "test" on the replicated copy of the virtual machine, without making a copy of the replicated virtual machine's virtual hard disks. For example, the method provides the ability to generate a "test" copy of the replicated virtual machine using two (or more) sets of differencing disks pointing to the same parent virtual hard disks. The writes executed from the "test" virtual machine are captured in one set of differencing disks, which are discarded when the test is complete. Periodic sync up changes or "deltas" arriving from the primary server may be collected in the other set of differencing disks, which can be merged into the parent once the test is complete.

The solution further provides the ability to continue replication while the initial replica for the virtual machine (e.g., the base virtual disk) is being transported out of band. The mechanism provides support for transporting the initial replica of the virtual machine "out of band;" i.e., outside the network transport channel used for transporting data from the primary site to the remote site. A differencing disk may be created on the remote site that is pointing to (or "parenting to") an empty virtual hard disk, where subsequent differencing disks received from the primary server during replication are chained on top of created differencing disk. When the out-of-band replica is received on the remote site, the differencing disk that was created to point to the empty virtual hard disk can be "re-parented" to point to the virtual hard disks received in the initial replica.

An example of depicting many of these points is now provided, which sets forth a representative example of a sequence of replication events according to the disclosure. FIGS. 7A-7F illustrate a representative example for asynchronously replicating storage of a virtual machine or other computing entity from a first computing environment to at least one other computing environment. Where appropriate, like reference numbers are used throughout FIGS. 7A-7F to identify like items.

In this example, a primary computing site 700 represents the first computing environment, and a second or "recovery" computing site 750 represents the second computing environment. The primary site 700 includes one or more operating computing devices (e.g., servers), as does the recovery site 750. The recovery site 750 represents one or more computing devices/servers capable of receiving virtual disks or other storage files for preservation and possible reanimation in the event of a disaster or other event impacting the primary site's 700 ability to carry out its duties.

While the present disclosure is applicable to tracking and replicating storage of any data device or structure using a native computing system, one embodiment involves tracking and replicating changes to a virtual disk used by a hypervisor-based virtualization system. In such a system, to track and replicate changes to the virtual disk used by a virtual machine, a differencing disk may be used for a running virtual machine. When a virtual machine is configured for tracking, a base virtual disk 702 associated with the primary site's 700 computing device(s) will be transferred or otherwise provided to the computing device(s) at the recovery site 750. This is depicted by the replicated base virtual disk 752 at the recovery site 750.

When the base virtual disk 702 has been write protected and copied to the recovery site 750, a first differencing disk D1 704 is created to capture any new writes involving the virtual disk. In other words, any changes to the virtual disk will then be made to the differencing disk 704 at the primary site 700, while at this point the recovery site has preserved the virtual disk at the replicated base virtual disk 752 state. In one embodiment, the replication (e.g., replication management module) on both the primary site 700 and recovery site 750 will store status information indicating that the transfer of the base virtual disk 702 to the replicated base virtual disk 752 is the most recent set of changes to be transferred. If the corresponding virtual machine (or other computing system) at the primary site 700 was to fail or otherwise be unable to perform its duties at this point, hardware at the recovery site 750 could begin functioning from the state of the virtual storage corresponding to the replicated base virtual disk 752.

Copies of the storage may be requested at any time, including in connection with a schedule. For example, replication management at the primary site 700 may make a request for a copy of the virtual storage after some time lapse, at a particular time, as a result of occurrence of an event, etc. The present disclosure contemplates multiple types of copies that can be created and transmitted to the recovery site 750, each of which may have its own schedule or other triggering criteria.

Figure 8:
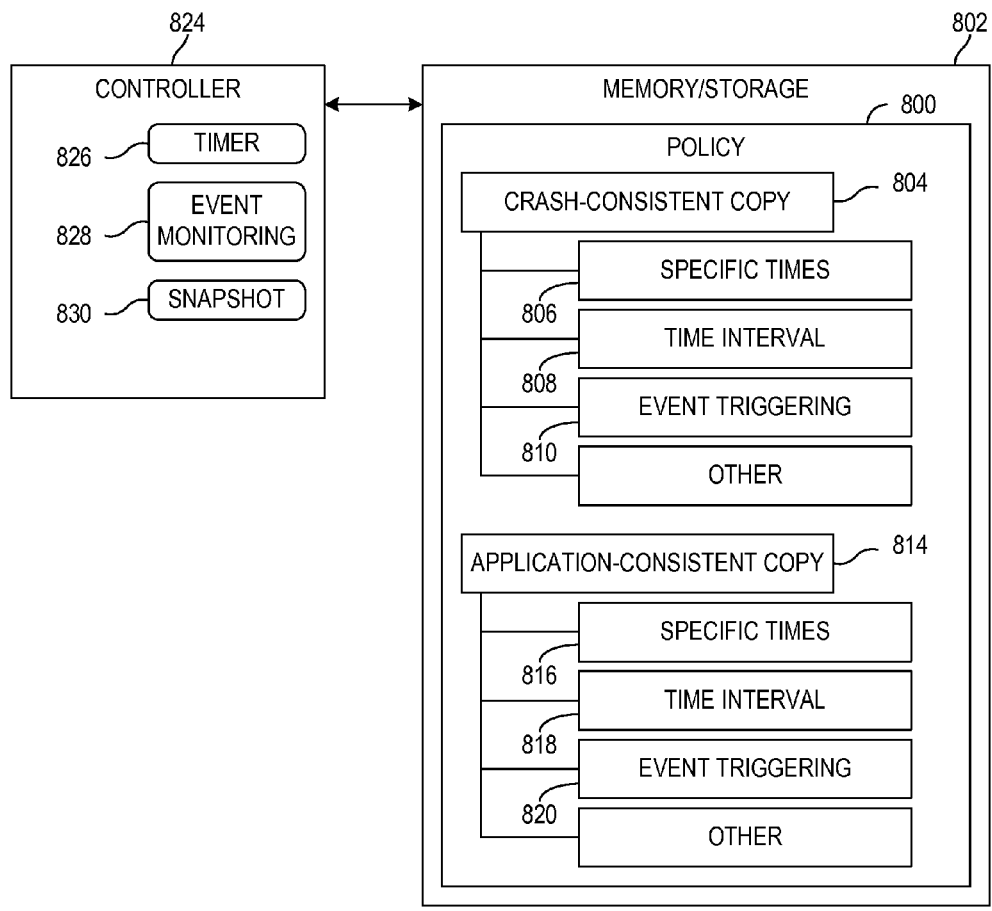
FIG. 8 illustrates an example of scheduling snapshots or other copies of a base or differencing disk.

Referring briefly to FIG. 8, an example of scheduling snapshots or other copies of a base or differencing disk is shown. A policy 800 may be stored in a memory or storage 802, which may be storage associated with the host computing system or otherwise. In one embodiment, the policy 800 includes rules for requesting copies of a differencing disk for replication to the recovery server. In the illustrated embodiment, two types of copies are accounted for, although fewer or more types of copies could be implemented. In this example, the policy 800 includes copy instructions for crash-consistent copies 804, such as any one or more of a specific time 806 in which a copy should be obtained, a fixed or changing time interval 808 between obtaining crash-consistent copies, other event triggering 810 that initiates a request for a crash-consistent copy, and the like. Similarly, the policy 800 may include analogous possibilities 816, 818, 820 for application-consistent copies 814, although the specific times 816, intervals 818 and/or event triggering 820 may differ from those of the other copy type(s). A controller 824, which may include a processor and executable software, can execute the policy 800. For example, the controller may execute a program(s), such as the replication management module previously described, to execute timer 826, event monitoring 828, and/or snapshot 830 functions based on the policy 800. In other embodiments, snapshots can be provided by other controller-executable programs, such as the volume shadow copy service (VSS) previously described.

Returning now to the example of FIGS. 7A-7F, FIG. 7B assumes that replication management has requested a first type of copy, referred to in this example as a crash-consistent copy. Such a copy may represent a copy of the virtual storage at any given moment. For example, a crash-consistent copy may be made by stopping write activity to the differencing disk D1 704 at any time. In one embodiment, when a crash-consistent copy of the virtual disk is requested, the virtual disk is closed off to further write operations, and a new differencing disk D2 706 is created to capture any new writes involving the virtual disk. Where the differencing disk D1 704 is closed off to new writes (e.g., marked read-only) at any planned or arbitrary moment without preparation, the running workload of the virtual machine (or other computing system) is not interrupted. While this type of copy enables the workload to continue operating without interruption and at normal speed, a possible consequence is that subsequent attempts to reanimate the copy at a recovery site 750 could potentially fail due to the differencing disk D1 704 copy having been obtained at an arbitrary moment.

As noted above, another differencing disk D2 706 is created to enable information to be written to the virtual disk when D1 704 has been preserved for ultimate transfer to the recovery site 750. Differencing disk D1 704 is made available to replication management for transfer to one or more recovery servers at the recovery site 750, as depicted by the replicated differencing disk D1 754 at the recovery site 750.

Updates to the primary site's 700 virtual disk from this point forward are captured in the new differencing disk D2 706.

Figure 7A:
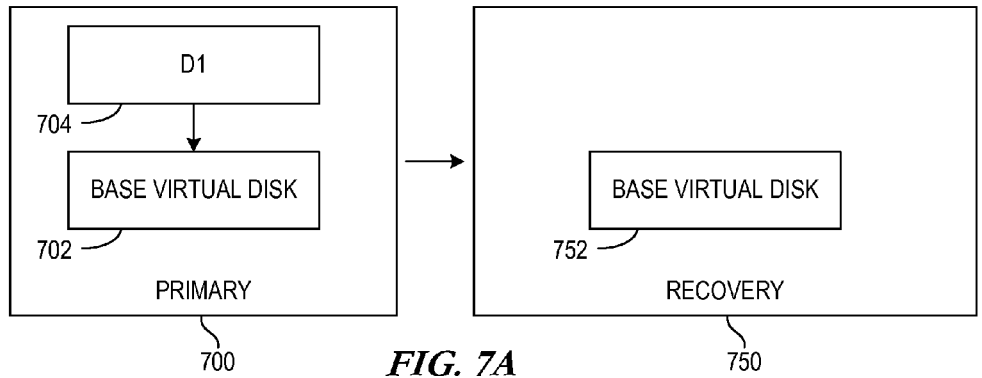
FIGS. 7A-7F illustrate a representative example for asynchronously replicating storage of a virtual machine or other computing entity from a first computing environment to at least one other computing environment.
Figure 7B:
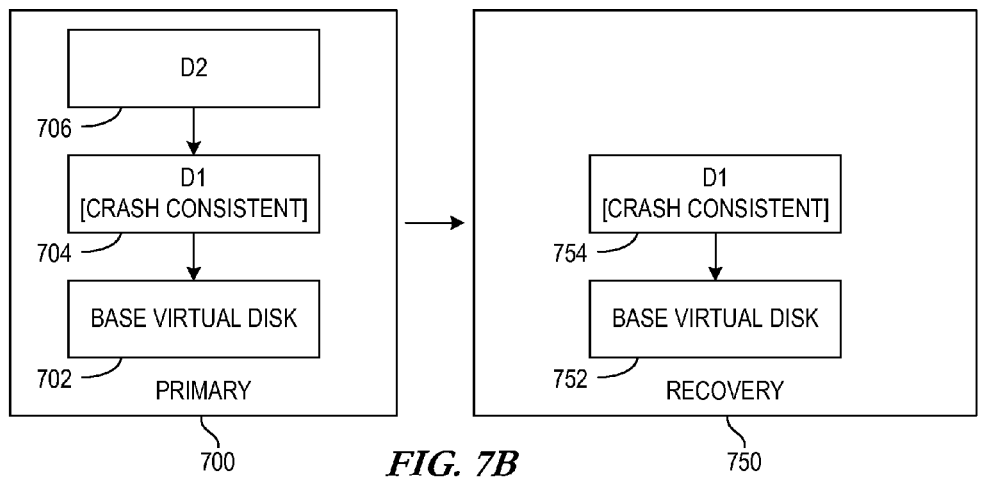
Figure 7C:
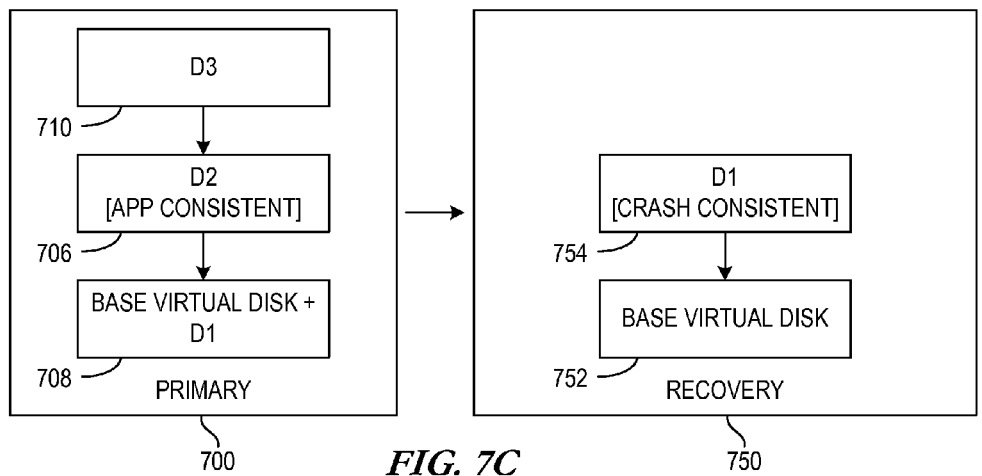

In one embodiment, the information stored in the differencing disk D1 704 is changed to read-only, such that it may no longer be modified by data writes. Rather, the new differencing disk D2 706 is configured to be written to and thus record changes to the virtual disk. Replication management at the primary site 700 may merge the read-only differencing disk D1 704 into its parent disk, which is the base virtual disk 702 in this example. An example of such a merge is shown in FIG. 7C, where D1 704 has been merged into the base virtual disk 702 to provide the new merged virtual disk 708.

Figure 9:
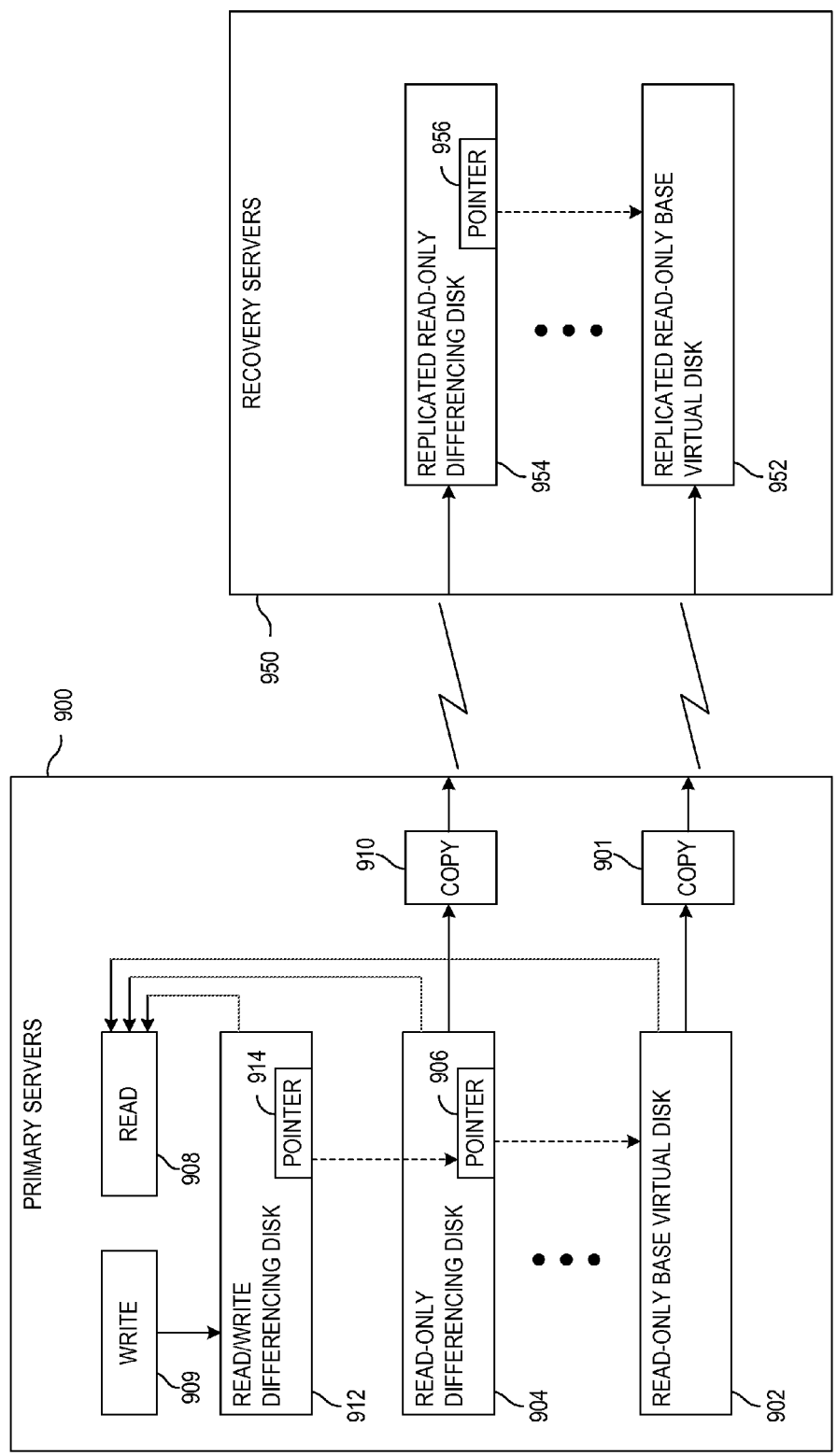
FIG. 9 illustrates an example of the linking, and modifications to the linking of replicated differencing disks, when accessing the chain of disks.

One purpose for performing a merge function is to reduce the number of links that a read operation may be subject to in order to locate stored data on the virtual disk. Referring now to FIG. 9, an example of such linking is described. It is assumed that a copy 901 of a base virtual disk 902 has been provided to the recovery servers 950, as depicted by the replicated base virtual disk 952. A newly-created differencing disk (e.g., differencing disk 904) will include a pointer 906 or link to its parent disk which is also the previous "tip of tree" disk. In this example, differencing disk 904 would include a pointer 906 to the base virtual disk 902. If a read operation 908 was issued on the primary servers 900 for data not found in the new differencing disk 904, the read operation 908 may obtain the data at a location farther back in the disk chain that is specified by the pointer 906, link or other analogous directing mechanism. In this example, the read operation 908 would obtain the data from the base disk 902, based on the pointer 906 in differencing disk 904, if differencing disk 904 did not have the data associated with the read request.

A copy 910 of the differencing disk 904 is provided to the recovery servers 950, as depicted by the replicated differencing disk 954. When the differencing disk 904 is write protected and copied 910 to the recovery servers 950, a new differencing disk 912 is created to accept changes to the virtual disk, such as by way of write operations 909. The new differencing disk 912 may include a link or pointer 914 to its parent, which is differencing disk 904 in this example. A read operation 908 may be issued for data that is not found in either differencing disk 912 or differencing disk 904, in which case the links or pointers 914, 906 point back to the base virtual disk 702 are provided to locate the addressed data.

Depending on the number of differencing disks that have been preserved in a read-only state, there could be numerous links to locate data as far back as the base virtual disk 702. In order to reduce overhead associated with such linking, differencing disks at the primary servers 900 that have been committed to read-only and transferred to the recovery servers 950 may be merged with their respective parent disks. Any desired differencing disks, up to all, that have been marked read-only or otherwise preserved for replication and transferred may be merged. As described more fully below, such merging may also be implemented at the recovery site 950.

Returning now to the example of FIGS. 7A-7F, FIG. 7C assumes that replication management has requested a second type of copy of the virtual disk, referred to in this example as an application-consistent copy. Where the first type of copy described in this example is a crash-consistent copy which is a general snapshot of storage of the running system, an application-consistent copy in this example generally refers to a snapshot of storage of the running system that has prepared itself to have the snapshot taken. Where the storage is prepared in this fashion, the snapshot is coherent in that it facilitates a high likelihood of successful reanimation at the replication site 750. A copy that has not prepared itself for the snapshot to be taken (e.g., crash-consistent copy) might not be coherent upon reanimation. For example, in the case of a crash-consistent copy, file system metadata, database metadata and/or other information may not make it onto the disk.

In one embodiment, a pre-prepared copy such as an application-consistent copy may be made in connection with a management module that informs the software in the system that a copy is to be made. For example, the volume shadow copy service (VSS) includes a process where the running software such as databases in the system can optionally register for a notification that informs that software of an imminent storage copy or snapshot, which provides the software time to provide records into a part of the disk image that is preserved.

Figure 7D:
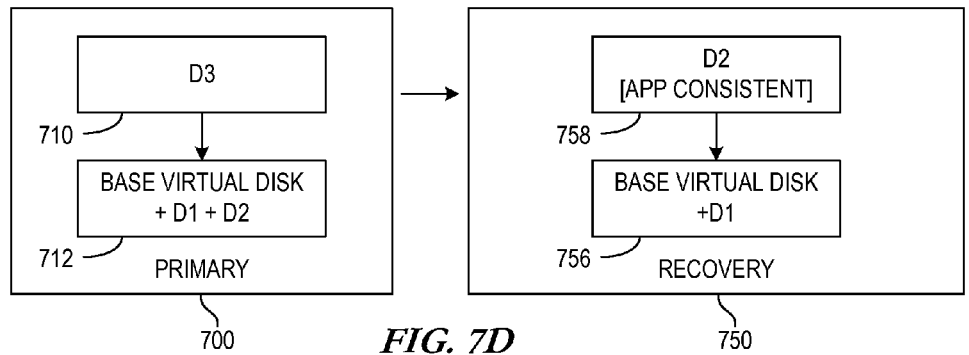

If the replication management at the primary site 700 makes a request for such a pre-prepared or "application-consistent" copy, the VSS or other management module for the operating system may be involved to generate the snapshot set. When the snapshot is created, the differencing disk D2 706 shown in FIG. 7C may be converted to read-only, and another new read/write differencing disk D3 710 may be created to now capture the data being written to the virtual disk. With differencing disk D3 710 now recording changes to the virtual disk, the prior "tip of tree" differencing disk D2 706 is transferred to the recovery site 750 as depicted by replicated differencing disk D2 758 shown in FIG. 7D With the transfer of the application-consistent copy of differencing disk D2 706 to the recovery site 750, a merge may again occur at the primary site 700. This is depicted in FIG. 7D, where the merged virtual disk 708 of FIG. 7C now includes D2 to form a new merged virtual disk 712. The replication management at the recovery site 750 makes note that replicated differencing disk D2 758, which has now been received from the primary site 700, is the latest copy of the disk from the primary site 700. As the D2 758 copy is an application-consistent copy and is also assumed to be crash-consistent, it serves as both the application-consistent copy and a crash-consistent copy of the disk from the primary site 700.

FIG. 7D also illustrates the merging of disks at the recovery site 750. The replicated crash-consistent copy D1 754 and replicated base virtual disk 752 have been merged in FIG. 7D to form the merged replicated virtual disk 756. As snapshots from the primary site 700 arrive at the recovery site 750, the snapshots may be collated and made ready to run. By merging and collating the received snapshots in this manner, if a disaster occurs where operation at the recovery site 750 will be relied upon, potential operational latencies can be mitigated or avoided by merging selected ones (or up to all) of the received copies at the recovery site 750. Thus, one embodiment involves merging and collating at least some of the snapshots or other copies of the virtual disk as they arrive, or at least prior to the time that the replicated data is being called upon for use at the recovery site 750.

Embodiments also include storing one or more of the snapshots or other copies received at the recovery site 750. In order to revert to a particular disk image, that disk image can be saved to enable recovery operation from that point. In embodiments that employ multiple types of snapshots (e.g., crash-consistent copy, application-consistent copy, etc.), one or more of each type of snapshot or other similar copy may be preserved to enable recovery from a desired one of the snapshot types. For example, crash-consistent copies may be provided to the recovery site 750 more regularly than application-consistent copies, which can be set by policy such as that described in connection with FIG. 8. In one embodiment, application-consistent copies are provided less frequently than crash-consistent copies, which is due to the potentially greater preparation and processing time, and consequent latency, involved in obtaining an application-consistent copy. In the event of disaster or other event calling for operation at the recovery site 750, the recovery servers may attempt to begin operation from a crash-consistent copy or an application-consistent copy, depending on many factors such as the relative time lapse from the most recent replicated copy of each type, the urgency in reestablishing operation at the recovery site 750, the extent of virtual disk modifications between the multiple types of snapshots, etc.

Figure 7E:
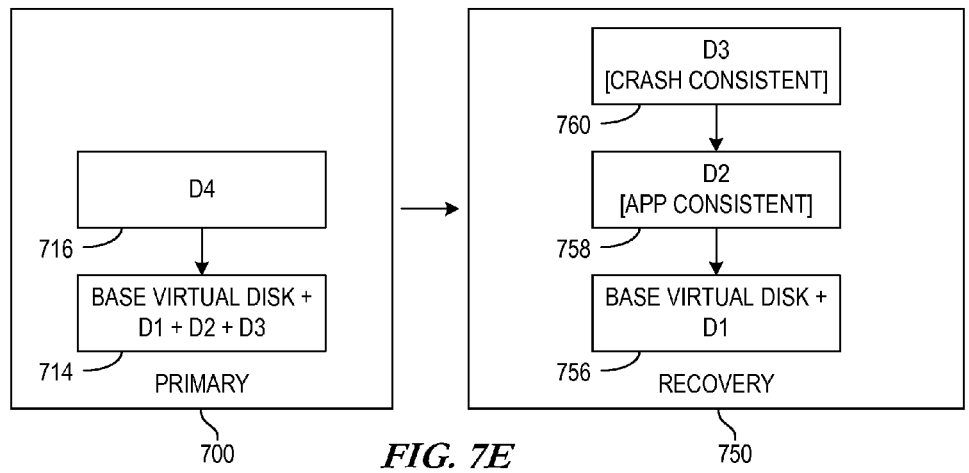

FIG. 7E illustrates the virtual storage trees on the primary site 700 and recovery site 750 in response to another crash-consistent copy being requested for transfer to the recovery site 750. In this example, the differencing disk D3 710 (FIG. 7D) is transferred to the recovery site 750 as shown by replicated differencing disk 760 in FIG. 7E. Again, differencing disk D3 710 at the primary site 700 may be merged into the virtual disk 712 to create a new merged differencing disk 714, and another new read/write differencing disk D4 716 may be created to capture changes to the virtual disk.

At the recovery site 750, the newly received crash-consistent copy 760 is now the most recent copy (tip of tree). In this embodiment, the replicated application-consistent copy D2 758 and the replicated crash-consistent copy D3 760 are both available as restoration points. For example, assume that a primary server at the primary site 700 fails or otherwise becomes unable to properly perform its duties, and assume this failure occurs at a point of time generally corresponding to that depicted in FIG. 7E. A recovery virtual machine (or alternatively physical machine) at the recovery site 750 may be invoked using, for example, the most recently received replicated application-consistent copy D3 760. Although the application-consistent copy D3 760 was received at the recovery site 750 earlier in time, it is a copy type that has a higher likelihood of reanimating properly at the recovery site 750. As noted above, this is due to this "type" of copy, which in this example involved notifying applications/software at the primary site 700 of the impending snapshot before the respective snapshot was taken, thereby enabling the software to prepare itself for the snapshot.

Figure 7F:
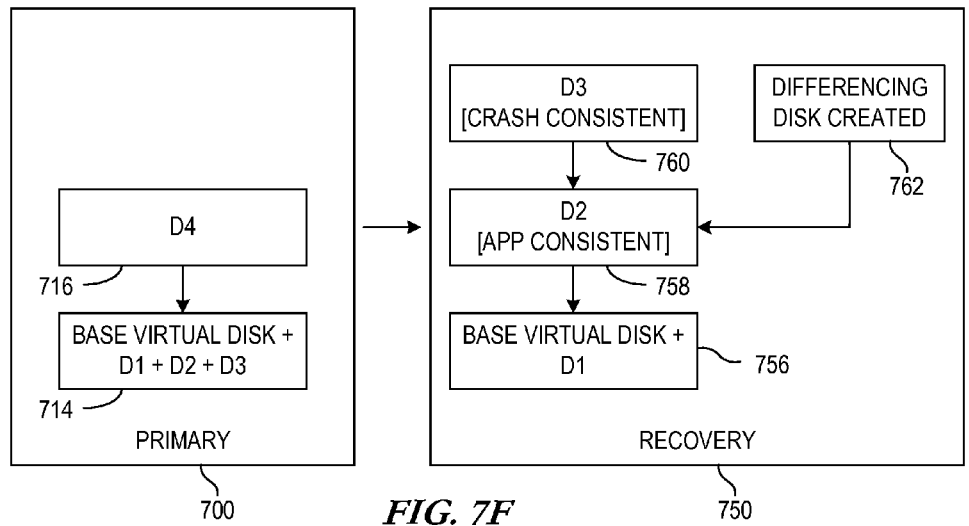

Thus, in one embodiment, a virtual machine or other computing system at a recovery site 750 can be brought up using one of a plurality of available differencing disks, snapshots, or other states of the replicated virtual storage. In one embodiment, a differencing disk is created as a child to the particular differencing disk from which the virtual machine is invoked. In the example of FIG. 7F, a differencing disk 762 is created with the replicated application-consistent differencing disk D2 758 as its parent. This differencing disk 762 is then surfaced and the volumes present on the disk are reverted to the application-consistent (e.g., VSS) snapshot set associated with D2 758.

As FIG. 7F illustrates, while preserving a line of differencing disks, it is possible to have multiple differencing disks point to the same read-only point in the tree. For example, replicated crash-consistent differencing disk D3 760 points to the application-consistent differencing disk D2 758, as does the differencing disk 762 that was created at the recovery site 750. Differencing disk D3 760 and differencing disk 762 therefore represent two different futures relative to the state of the read-only differencing disk D2 758. For example, a user could choose to boot a virtual machine at the recovery site 750 using the virtual disk including the differencing disk 762, the read-only differencing disk 758 pointed to by differencing disk 762, and the merged disk 756 pointed to by the differencing disk D2 758.

Thus, in the illustrated example, automatic or manual selection of a first virtual disk at the recovery site 750 may include the read-only disk 756 (including the base virtual disk and D1), the read-only application-consistent differencing disk D2 758, and the read/write crash-consistent differencing disk D3 760. Alternatively, automatic or manual selection of a second virtual disk may include the read-only disk 756 (including the base virtual disk and D1), the read-only application-consistent differencing disk D2 758, and the differencing disk 762 that was created at the recovery site 750. Different recovery scenarios are possible in view of the different "futures" provided by having multiple read/write differencing disks point to a common parent disk.

Any of one or more available virtual disk chains may be selected at the recovery site 750. For instance, a user may choose to preserve the crash-consistent disk D3 760 because the virtual machine did not have the desired data when it was booted using the application-consistent disk D2 758. In this case, the virtual machine may be run using the crash-consistent disk D3 760. Even if a recovery virtual machine is reanimated using the application-consistent disk D2 758 and a new differencing disk 762 is created that points back to the application-consistent moment, the crash-consistent disk D3 760 may be preserved as another reanimation chain possibility.

The differencing disk 762 could alternatively be created from a different differencing disk. For example, if the last crash-consistent copy D3 760 was to be used for recovery, then the differencing disk 762 could be created with the crash-consistent copy D3 760 as the parent disk. In one embodiment, this may be effected by having a pointer or other link stored at the differencing disk 762 point to or otherwise identify D3 760 as its parent. An example was depicted in FIG. 9, where the pointer 956 pointed to its parent disk 952. The pointer 956 may need to be changed from its state in the primary servers 900, so that it points to the correct image at the recovery servers 950. The decision whether the restoration point in FIG. 7F is to be D2 758, D3 760, or other restoration point may be determined automatically based on configurations, or determined manually by a user.

An example of the creation and representative content associated with the differencing disk 762 at the recovery site is now described. In this representative embodiment, the differencing disk 762 at the recovery site 750 is empty upon its creation. It may be configured to point to its parent disk, which is D2 758 in this example. When the virtual (or physical) machine begins operation, information that may need to be written will be written to the new differencing disk 762. For example, the new differencing disk 762 may be connected to a replicated virtual machine at the recovery site 750 having the same or similar characteristics as a primary virtual machine at the primary site 700. When this replicated virtual machine is booted, it may consider its virtual disks capable of being both written to and read from. The new differencing disk 762 can be written to, while information can be read from the new differencing disk 762, its parent, or earlier lineage depending on where the information resides.

In addition to the differencing disk 762 serving as the read/write disk when the associated recovery server(s) is in operation, the differencing disk may also store data prior to a time in which replicated storage at the recovery site 750 will be used. For example, the differencing disk 762 may store data written to a differencing disk received from the primary site 750, and that occurred between the time the snapshot was taken at the primary site 750 and the time that differencing disk was marked as read-only.

As an example, assume a replication management module at the primary site 700 requests the running workload of a virtual machine to make an application-consistent copy of the virtual storage or other snapshot that involves software preparing itself for the snapshot. In response, application software may attempt to make itself coherent for the snapshot, but it may be difficult to coordinate the snapshot being taken in the virtual disk with the information "flushes" that are occurring in the application. When the application software appears to have completed the data flush to storage, the virtual disk snapshot is taken. Thereafter, the snapshotted differencing disk is marked read-only, and a new differencing disk is created. Between the time that the virtual disk snapshot is taken and the time that the corresponding differencing disk was written to read-only, one or more stray data writes may have found their way onto the differencing disk that was the subject of the snapshot. Therefore, it is possible that the differencing disk may not correspond exactly with the differencing disk snapshot 758 that was transferred to the recovery site 750. In this case, even without having failed over to the recovery site 750, the differencing disk 758 can be mounted as a live virtual disk in order to locate those stray writes, and to back those stray writes out of the differencing disk D2 758 and onto the differencing disk 762 created at the recovery site 750. In this manner, if a failover is ultimately needed, this task has already been handled. This function of backing out the stray writes may be accomplished using the virtual machine that would eventually be recovered, or alternatively could be done as part of a service that mounts the disk image and manipulates it to extract the stray writes.

Figure 10:
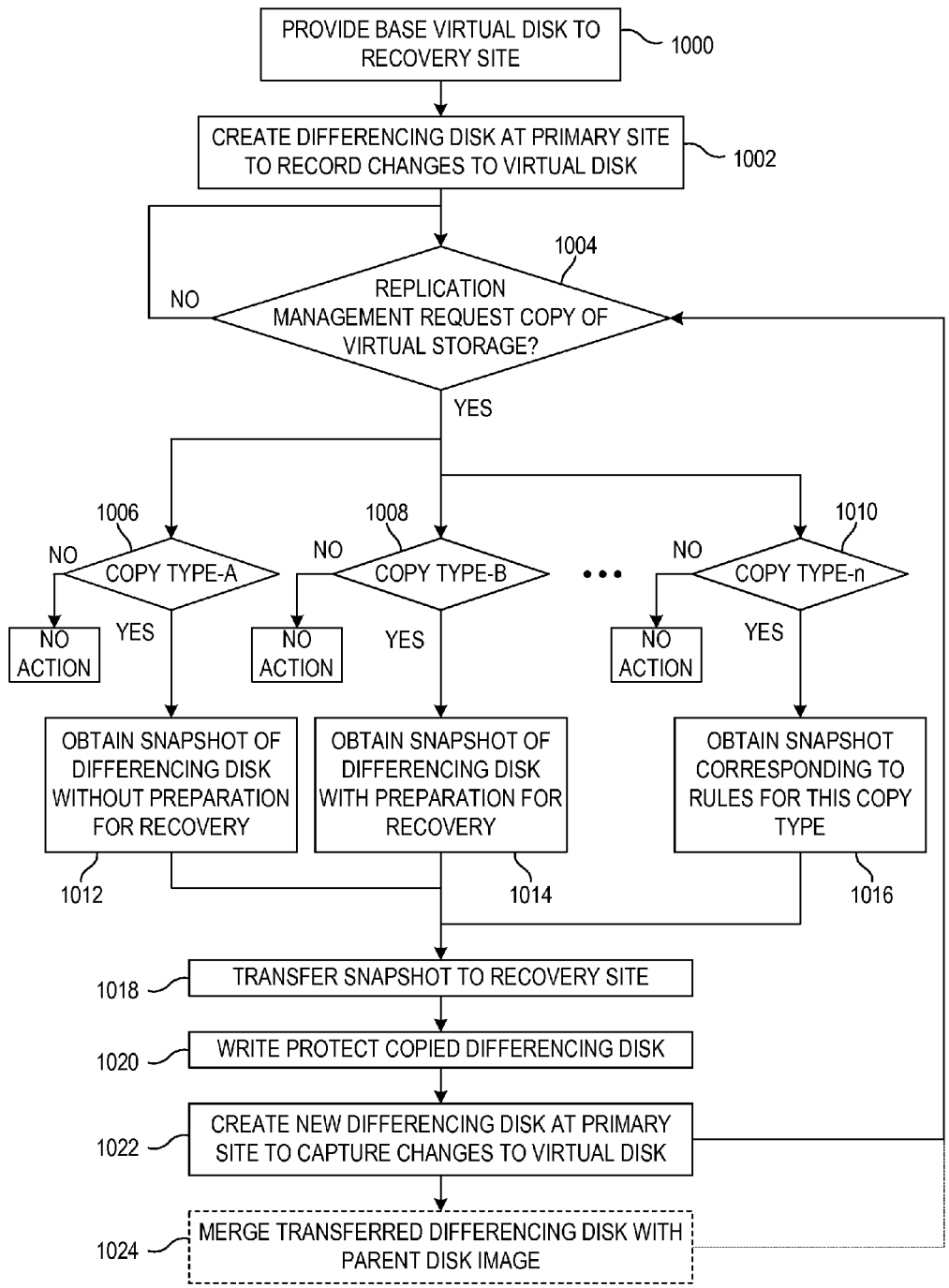
FIG. 10 is a flow diagram illustrating representative features from the perspective of at least one primary server at the primary site that is to have its storage replicated.

The example of FIGS. 7A-7F depicts exemplary actions taken at each of the primary and recovery sites. FIG. 10 is a flow diagram illustrating representative features from the perspective of at least one primary server at the primary site that is to have its virtual storage (or other storage) replicated. This example assumes that virtual storage is being replicated, and that multiple types of copies of the virtual storage are made available.

In this example, a base virtual disk is provided to the recovery site as depicted at block 1000. As shown at block 1002, a differencing disk or other storage structure is created at the primary site to record changes to the virtual disk. In this example, some number "n" of different types of snapshots/copies are provided, including copy type-A, copy type-B through copy type-n. When replication management or other primary site control module requests a copy of the virtual storage as determined at block 1004, it may specify which type of copy is desired. The identification of a copy type may be made by a user via a user interface, or configured into hardware or software such as being requested pursuant to a policy such as that described in connection with FIG. 8, or otherwise.

In this example, if replication management requested a copy of type-A as determined at block 1006, a snapshot or other copy of the differencing disk is obtained without the software preparing itself for the virtual storage copy to occur, as shown at block 1012. This may be, for example, a VSS snapshot or other application-consistent snapshot. If a copy of type-B is requested as determined at block 1008, a snapshot or other copy of the differencing disk is obtained where at least some of the software prepared for the virtual storage copy to occur, as shown at block 1014. Other types of copies may be defined, whereby the copy type can be determined at block 1010, and as shown at block 1016 the snapshot or other copy may be obtained in accordance with the rules for that copy type.

When the appropriate snapshot or other copy has been obtained, it may be transferred to the recovery site as shown at block 1018. Block 1020 illustrates that the differencing disk that was copied at the primary site is write protected, and block 1022 shows that a new differencing disk will be created to capture changes to the virtual disk. At least for the reasons of reducing storage capacity requirements and reducing latencies in reading data through the disk chain, intermediate disks may be merged with their parent disk image as shown at block 1024.

It should be recognized that the particular order of the illustrated features in FIG. 10, and other flow diagrams in the disclosure, should not be interpreted as a limitation of order or sequence. The particular order of operations depicted may in many cases be irrelevant, unless otherwise described as relevant. For example, the snapshot may or may not be transferred at block 1018 before the copied differencing disk is write protected at block 1020.

Figure 11:
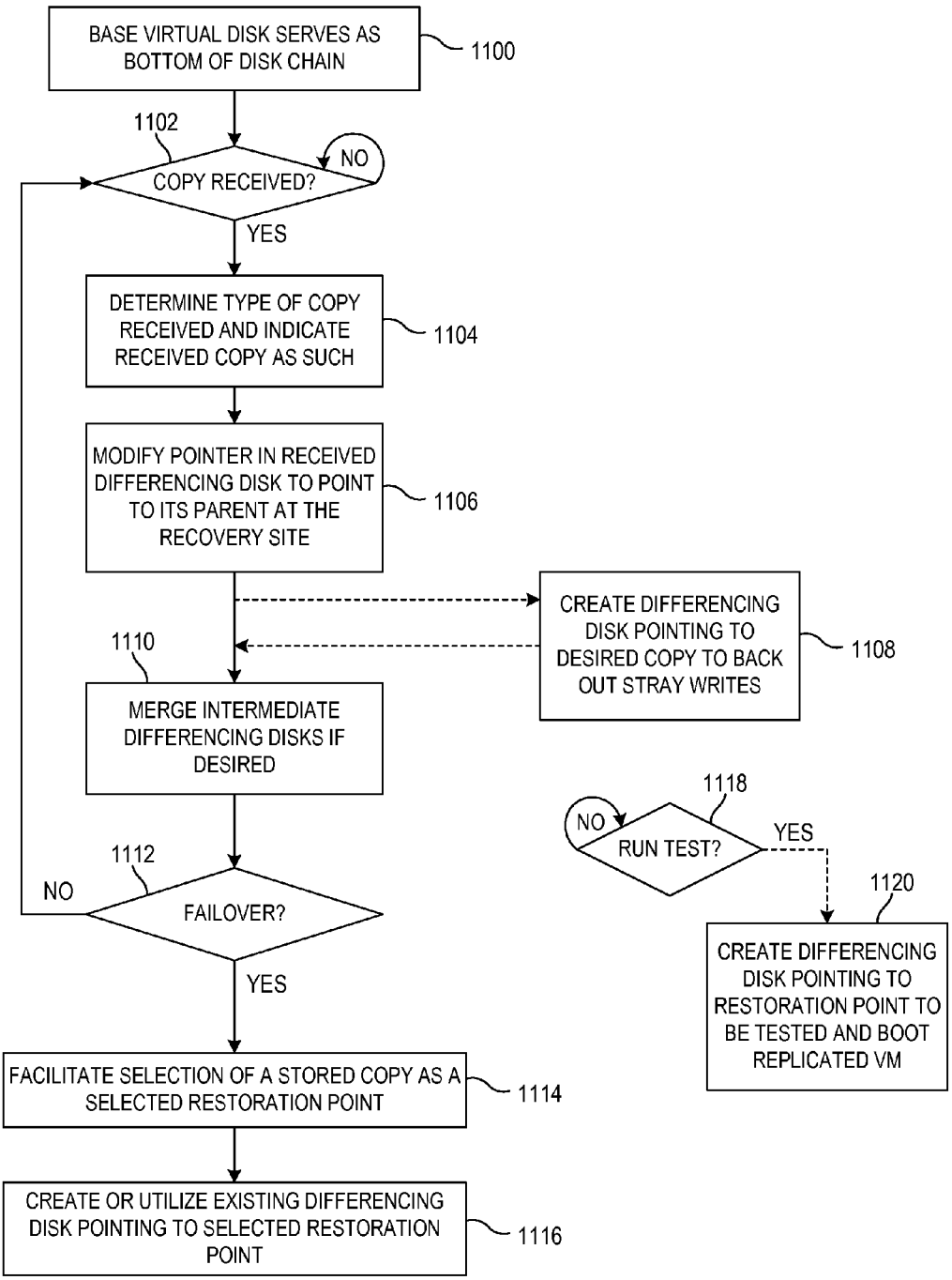
FIG. 11 is a flow diagram illustrating representative features from the perspective of at least one recovery server at the recovery site that is replicating a virtual machine(s)

FIG. 11 is a flow diagram illustrating representative features from the perspective of at least one recovery server at the recovery site that is replicating a virtual machine(s). This example assumes that virtual storage is being replicated, and that multiple types of copies of the virtual disks are provided by the primary site. As shown at block 1100, the base virtual disk received as a replication of the primary site's base virtual disk is provided as the base of the virtual disk chain at the recovery site. When a snapshot or other copy is received from the primary as determined at block 1102, the type of copy received is determined at block 1104. The resulting copy of the differencing disk at the recovery site can be identified as the type of copy it is, such as application-consistent, crash-consistent, etc. The pointer or other link in the received copy may be modified as shown in block 1106, in order to cause the pointer to point to its parent at the recovery site. If desired, intermediate differencing disks may be merged into their respective parent disks, as shown at block 1110. Additionally, block 1108 shows that a differencing disk may be created to point to a desired copy in order to back out stray writes, as was described in connection with FIG. 7F.

If and when a failover to the recovery server(s) occurs as determined at block 1112, selection of a stored copy as a selected restoration point may be facilitated as shown at block 1114. For example, facilitating selection of a stored copy may involve providing a user interface to enable an administrator or other user to select which stored (and thus not merged) copy the replicated virtual machine will utilize when initialized and run. Other embodiments may involve automatic selection of a particular copy based on criteria. For example, criteria may automatically cause the virtual machine to first attempt reanimation from an application-consistent copy, and to subsequently try a different copy of that reanimation was not sufficiently successful. In one embodiment depicted at block 1116, a differencing disk is created, or an existing differencing disk utilized (e.g., a differencing disk created at block 1108), to point to the selected snapshot or copy. Among other things, this differencing disk provides the read/write capability to the replicated virtual disk when the replicated virtual machine is operating.

In one embodiment, a test may be run on the replicated virtual machine. In this case, the replicated virtual machine continues to receive changes to the virtual disk as before (e.g., receiving copies of primary site differencing disks), while the test virtual machine is brought up from the point of the created differencing disk. Thus, replication can be continued while running the test on the replicated copy of the virtual machine without making a copy of the replicated virtual machine's virtual hard disks. This provides a manner of generating a test copy of the replicated virtual machine using two sets of differencing disks pointing to the same parent virtual hard disks. The writes executed from the test virtual machine are captured in one set of differencing disks, and these disks may be discarded once the test is complete. Periodic sync up copies of differencing disks arriving from the primary server are collected in the other set of differencing disks, and may be merged into the parent once the test is complete. This option is depicted in FIG. 11. If a test is to be run as determined at block 1112, a differencing disk is created 1114 that points to the restoration point to be tested, and the replicated virtual machine may be booted to run the test.

Figure 12:
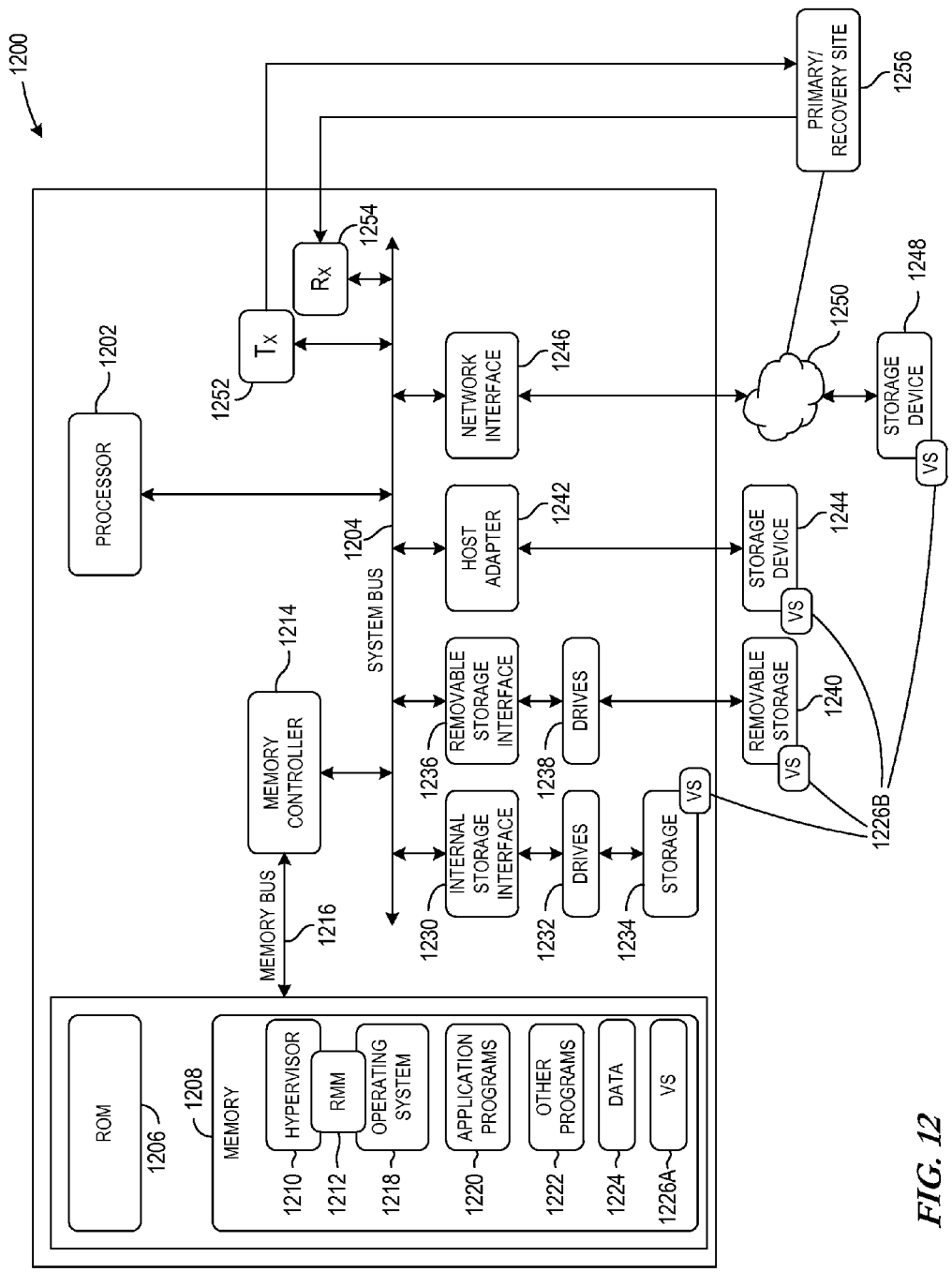
FIG. 12 depicts a representative computing system in which the principles described herein may be implemented.

FIG. 12 depicts a representative computing system 1200 in which the principles described herein may be implemented. The computing environment described in connection with FIG. 12 is described for purposes of example, as the structural and operational disclosure for replicating storage or virtual storage is applicable in any computing environment. The computing arrangement of FIG. 12 may, in some embodiments, be distributed across multiple devices. Further, the description of FIG. 12 may represent a server or other computing device at either the primary or recovery site.

The representative computing system 1200 includes a processor 1202 coupled to numerous modules via a system bus 1204. The depicted system bus 1204 represents any type of bus structure(s) that may be directly or indirectly coupled to the various components and modules of the computing environment. Among the various components are storage devices, any of which may store the subject to the replication.

A read only memory (ROM) 1206 may be provided to store firmware used by the processor 1202. The ROM 1206 represents any type of read-only memory, such as programmable ROM (PROM), erasable PROM (EPROM), or the like. The host or system bus 1204 may be coupled to a memory controller 1214, which in turn is coupled to the memory 1208 via a memory bus 1216. The exemplary memory 1208 may store, for example, all or portions of a hypervisor 1210 or other virtualization software, an operating system 1218, and a module, such as a replication management module (RMM) 1212 that performs at least those functions described herein. The RMM 1212 may be implemented as part of, for example, the hypervisor 1210 and/or operating system 1218.

The memory may also store application programs 1220 and other programs 1222, and data 1224. Additionally, all or part of the virtual storage 1226 may be stored in the memory 1208. However, due to the potential size of the virtual storage disks, one embodiment involves storing virtual storage disks in storage devices versus memory, as depicted by the virtual storage 1226B associated with any one or more of the representative storage devices 1234, 1240, 1244, 1248. The virtual storage 1226A in the memory 1208 may also represent any part of the virtual storage that is temporarily cached or otherwise stored in memory as an intermediate step to being processed, transmitted, or stored in a storage device(s) 1234, 1240, 1244, 1248.

FIG. 12 illustrates various representative storage devices in which data may be stored, and/or virtual storage may be stored. For example, the system bus may be coupled to an internal storage interface 1230, which can be coupled to a drive(s) 1232 such as a hard drive. Storage media 1234 is associated with or otherwise operable with the drives. Examples of such storage include hard disks and other magnetic or optical media, flash memory and other solid-state devices, etc. The internal storage interface 1230 may utilize any type of volatile or non-volatile storage. Data, including virtual hard disks (e.g., VHD files, AVHD files, etc.) may be stored on such storage media 1234.

Similarly, an interface 1236 for removable media may also be coupled to the bus 1204. Drives 1238 may be coupled to the removable storage interface 1236 to accept and act on removable storage 1240 such as, for example, floppy disks, optical disks, memory cards, flash memory, external hard disks, etc. Virtual storage files and other data may be stored on such removable storage 1240.

In some cases, a host adaptor 1242 may be provided to access external storage 1244. For example, the host adaptor 1242 may interface with external storage devices via small computer system interface (SCSI), Fibre Channel, serial advanced technology attachment (SATA) or eSATA, and/or other analogous interfaces capable of connecting to external storage 1244. By way of a network interface 1246, still other remote storage may be accessible to the computing system 1200. For example, wired and wireless transceivers associated with the network interface 1246 enable communications with storage devices 1248 through one or more networks 1250. Storage devices 1248 may represent discrete storage devices, or storage associated with another computing system, server, etc. Communications with remote storage devices and systems may be accomplished via wired local area networks (LANs), wireless LANs, and/or larger networks including global area networks (GANs) such as the Internet. Virtual storage files and other data may be stored on such external storage devices 1244, 1248.

As described herein, the primary and recovery servers communicate information, such as snapshots or other copies. Communications between the servers can be effected by direct wiring, peer-to-peer networks, local infrastructure-based networks (e.g., wired and/or wireless local area networks), off-site networks such as metropolitan area networks and other wide area networks, global area networks, etc. A transmitter 1252 and receiver 1254 are depicted in FIG. 12 to depict the computing device's structural ability to transmit and/or receive data in any of these or other communication methodologies. The transmitter 1252 and/or receiver 1254 devices may be stand-alone components, may be integrated as a transceiver(s), may be integrated into or already-existing part of other communication devices such as the network interface 1246, etc. Where the computing system 1200 represents a server or other computing device at the primary site, all or part of the virtual disk or other stored data to be replicated may be transmitted via the transmitter 1252, whether it is a stand-alone device, integrated with a receiver 1254, integral to the network interface 1246, etc. Analogously, where the computing system 1200 represents a server or other computing device at the recovery site, all or part of the virtual disk or other stored data to be replicated may be received via the receiver 1254, whether it is a stand-alone device, integrated with a transmitter 1252, integral to the network interface 1246, etc. As computing system 1200 can represent a server(s) at either the primary or recovery site, block 1256 represents the primary or recovery server(s) that is communicating with the computing system 1200 that represents the other of the primary or recovery server(s).

As demonstrated in the foregoing examples, the embodiments described herein facilitate disaster recovery and other replication features. In various embodiments, method are described that can be executed on a computing device, such as by providing software modules that are executable via a processor (which includes a physical processor and/or logical processor, controller, etc.). The methods may also be stored on computer-readable media that can be accessed and read by the processor and/or circuitry that prepares the information for processing via the processor. Having instructions stored on a computer-readable media as described herein is distinguishable from having instructions propagated or transmitted, as the propagation transfers the instructions versus stores the instructions such as can occur with a computer-readable medium having instructions stored thereon. Therefore, unless otherwise noted, references to computer-readable media/medium having instructions stored thereon, in this or an analogous form, references tangible media on which data may be stored or retained.

Although the subject matter has been described in language specific to structural features and/or methodological acts, it is to be understood that the subject matter defined in the appended claims is not necessarily limited to the specific features or acts described above. Rather, the specific features and acts described above are disclosed as representative forms of implementing the claims.

What is claimed is:

1. An apparatus comprising:
one or more storage devices that store replicated virtual storage of a replicated virtual machine, including at least a replicated base virtual disk substantially corresponding to a primary base virtual disk to be replicated;
a receiver configured to receive a plurality of copies of differencing disks, of a plurality of copy types, each associated with the primary base virtual disk; and
a replication management module configured to:
arrange the received copies of the differencing disks of the plurality of copy types relative to the replicated base virtual disk as the differencing disks were arranged relative to the primary base virtual disk, the received copies of the differencing disks of the plurality of copy types and the replicated base virtual disk being arranged in a chain, a first differencing disk of the received copies arranged in the chain comprising an application-consistent copy type based on application data that has been prepared for creation of the copy, and a second differencing disk of the received copies arranged in the chain comprising a crash-consistent snapshot type based on application data that has not been prepared for creation of the copy, the first differencing disk and the second differencing disk having a parent-child relationship,
store a plurality of the received copies of the differencing disks, each of the plurality of received copies of the differencing disks being selectable as a potential restoration point for initiating operation of the replicated virtual machine.

2. The apparatus of claim 1, wherein the replication management module is further configured to facilitate initiation of the replicated virtual machine from a selected one of the potential restoration points and one or more selected stored copies of the differencing disks that sequentially succeed the selected restoration point.

3. The apparatus of claim 2, wherein the replication management module is further configured to enable reanimation of the replicated virtual machine from the selected one of the potential restoration points, but using one or more different selected stored copies of the differencing disks that also sequentially succeed the selected restoration point.

4. The apparatus of claim 2, wherein the replication management module is further configured to enable reanimation of the replicated virtual machine from a different selected one of the potential restoration points and the one or more selected stored copies of the differencing disks that sequentially succeed the different selected restoration point.

5. The apparatus of claim 1, wherein the replication management module is further configured to merge one or more read-only copies of the differencing disks into their respective parent disks.

6. The apparatus of claim 1, wherein the replication management module is further configured to modify links in the copies of the differencing disks to point to their respective parent disks as arranged for use with the replicated virtual machine.

7. The apparatus of claim 1, wherein the replication management module is configured for implementation in a hypervisor.

8. A computer-implemented method on a first computing device comprising:
storing a base virtual disk image of a virtual disk associated with a virtual machine;
storing changes to the virtual disk by recording the changes to a current read-write differencing disk at the top of a disk chain that includes the base virtual disk image and any intervening differencing disks, write operations performed by the virtual machine being directed only to the current read-write differencing disk, at least a first of the intervening differencing disks in the disk chain being of an application-consistent copy type based on application data that has been prepared for creation of the copy and at least a second of the intervening differencing disks in the disk chain being of crash-consistent snapshot type based on application data that has not been prepared for creation of the copy, the first of the intervening differencing disks in the disk chain and the second of the intervening differencing disks in the disk chain having a parent-child relationship;
recurrently creating transferable copies of the changes to the virtual disk for replicated storage by creating a copy of the current read-write differencing disk and prohibiting further changes thereto, creating a new current differencing disk at the top of the disk chain, and transferring the copies of the differencing disks for the replicated storage to a second computing device.

9. The computer-implemented method of claim 8, wherein creating a copy of the current read-write differencing disk comprises creating a plurality of different types of copies of the current read-write differencing disk, and wherein transferring the copies of the differencing disks comprises transferring each of the different types of copies of the differencing disks for the replicated storage.

10. The computer-implemented method of claim 8, wherein creating a copy of the current read-write differencing disk comprises creating at least two types of copies of the current read-write differencing disk, including at least a first copy type obtained on application data that has been prepared for the copy to be created, and including at least a second copy type obtained on application data that has not been prepared for the copy to be created.

11. The computer-implemented method of claim 10, further comprising notifying one or more applications of an impending copy, and wherein creating the first copy type comprises obtaining the application data from the one or more notified applications that have been prepared for the copy to be created.

12. The computer-implemented method of claim 11, wherein creating the first copy type comprises creating a volume shadow copy service (VSS) snapshot of the current read-write differencing disk.

13. The computer-implemented method of claim 10, wherein creating the second copy type comprises copying a file storing the current read-write differencing disk and configuring the file as read-only, without notifying applications of an impending copy.

14. The computer-implemented method of claim 10, wherein creating at least two types of copies of the current read-write differencing disk comprises creating the copies of the first copy type in connection with a first copy schedule, and creating the copies of the second copy type in connection with a second copy schedule.

15. The computer-implemented method of claim 8, further comprising:
receiving a read operation to a first differencing disk of the differencing disks in the disk chain; and
obtaining data not found in the first differencing disk from a parent disk of the first differencing disk in accordance with a pointer included in the first differencing disk that specifies the parent disk.

16. The computer-implemented method of claim 8, further comprising:
maintaining the base virtual disk image and the differencing disks on the first computing device after said transferring, one or more read operations performed by the virtual machine being initially directed to the current read-write differencing disk and, in response to a determination that data requested by the one or more read operations is not found in the current read-write differencing disk, sequentially directing the one or more read operations to at least one of one or more of the intervening differencing disks and the base virtual disk image in the disk chain until the data requested by the one or more read operations is found.

17. Computer-readable media having instructions stored thereon which are executable by a computing system for performing steps comprising:
creating a chain of read-only snapshots of a virtual machine's differencing disk, with a new differencing disk being created upon each snapshot that provides read and write capability at the tip of the chain, the chain including a plurality of types of the snapshots on the chain, including at least an application-consistent snapshot type based on application data that has been prepared for creation thereof and a crash-consistent snapshot type based on application data that has not been prepared for creation thereof, a first snapshot in the chain being of the application-consistent snapshot type and a second snapshot in the chain being of the crash-consistent snapshot type having a parent-child relationship;
servicing write operations performed by the virtual machine by only accessing the new differencing disk at the tip of the chain;
determining whether data requested by one or more read operations is found in the new differencing disk at the tip of the chain;
in response to determining that the data requested by the one or more read operations is found in the new differencing disk at the tip of the chain, servicing the one or more read operations by the new differencing disk at the tip of the chain; and
in response to determining that the data requested by the one or more read operations is not found in the new differencing disk at the tip of the chain, sequentially servicing the one or more read operations by one or more of the read-only snapshots until the data requested by the one or more read operations is found.

18. The computer-readable media as in claim 17, further comprising:
providing a copy of the chain of the read-only snapshots to a replicated virtual machine.

19. The computer-readable media as in claim 18, wherein each of the read-only snapshots are enabled for selection as a restoration point for initiating operation of the replicated virtual machine.

20. The computer-readable media as in claim 17, wherein at least one of the read-only snapshots is a VSS snapshot.

* * * * *